United States Patent
Ohnuki

(10) Patent No.: US 9,450,438 B2
(45) Date of Patent: Sep. 20, 2016

(54) POWER DEVICE

(71) Applicant: HONDA MOTOR CO., LTD., Tokyo (JP)

(72) Inventor: Yasumichi Ohnuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 14/263,084

(22) Filed: Apr. 28, 2014

(65) Prior Publication Data

US 2014/0361625 A1    Dec. 11, 2014

(30) Foreign Application Priority Data

Jun. 6, 2013  (JP) .................. 2013-119938

(51) Int. Cl.
  H02J 1/00    (2006.01)
  H02J 3/00    (2006.01)
  H02J 7/00    (2006.01)
  H02M 3/158   (2006.01)
  H02M 1/00    (2006.01)

(52) U.S. Cl.
  CPC ............ *H02J 7/0065* (2013.01); *H02M 3/158* (2013.01); *H02M 2001/0074* (2013.01); *H02M 2001/0077* (2013.01); *Y10T 307/653* (2015.04)

(58) Field of Classification Search
  CPC ............... H02J 7/0065; H02M 3/158; H02M 2001/0074; Y10T 307/653
  USPC .......................................................... 307/71
  See application file for complete search history.

(56) References Cited

U.S. PATENT DOCUMENTS

| | | | | |
|---|---|---|---|---|
| 9,041,251 B2 * | 5/2015 | Schill | ................... | H02M 3/155 307/37 |
| 2009/0278496 A1 | 11/2009 | Nakao et al. | | |
| 2012/0113694 A1 | 5/2012 | Schill | | |

FOREIGN PATENT DOCUMENTS

| | | |
|---|---|---|
| DE | 102011011330 A1 | 5/2012 |
| DE | 102011018357 A1 | 10/2012 |
| DE | 102013005070 A1 | 9/2014 |
| EP | 2448099 A1 | 5/2012 |
| JP | 2012-060838 A | 3/2012 |
| JP | 2012-152079 A | 8/2012 |

OTHER PUBLICATIONS

Search Report dated Jan. 19, 2015, issued in German Application No. 102014210350.9, w/English translation, (18 pages).
Office Action dated Jan. 19, 2015, issued in German Application No. 1020142103509, w/English translation. (12 pages).

* cited by examiner

*Primary Examiner* — Rexford Barnie
*Assistant Examiner* — Toan Vu
(74) *Attorney, Agent, or Firm* — Westerman, Hattori, Daniels & Adrian, LLP

(57) ABSTRACT

A first converter circuit 11 controls a voltage, applied between a first electrical potential point P1 and a fourth electrical potential point P4, to be within a range from a first voltage VB1 or a second voltage VB2 to a summed voltage (VB1+VB2) of the first voltage VB1 and the second voltage VB2, and/or controls the voltage, applied between the first electrical potential point P1 and the fourth electrical potential point P4, to be equal to or more than the summed voltage (VB1+VB2) of the first voltage VB1 and the second voltage VB2. A second converter circuit 12 controls a voltage, applied between a third electrical potential point P3 and a sixth electrical potential point P6, to be within a range from a second voltage VB2 or a third voltage VB3 to a summed voltage (VB2+VB3) of the second voltage VB2 and the third voltage VB3, and/or controls the voltage, applied between the third electrical potential point P3 and the sixth electrical potential point P6, to be equal to or more than the summed voltage (VB2+VB3) of the second voltage VB2 and the third voltage VB3.

9 Claims, 24 Drawing Sheets

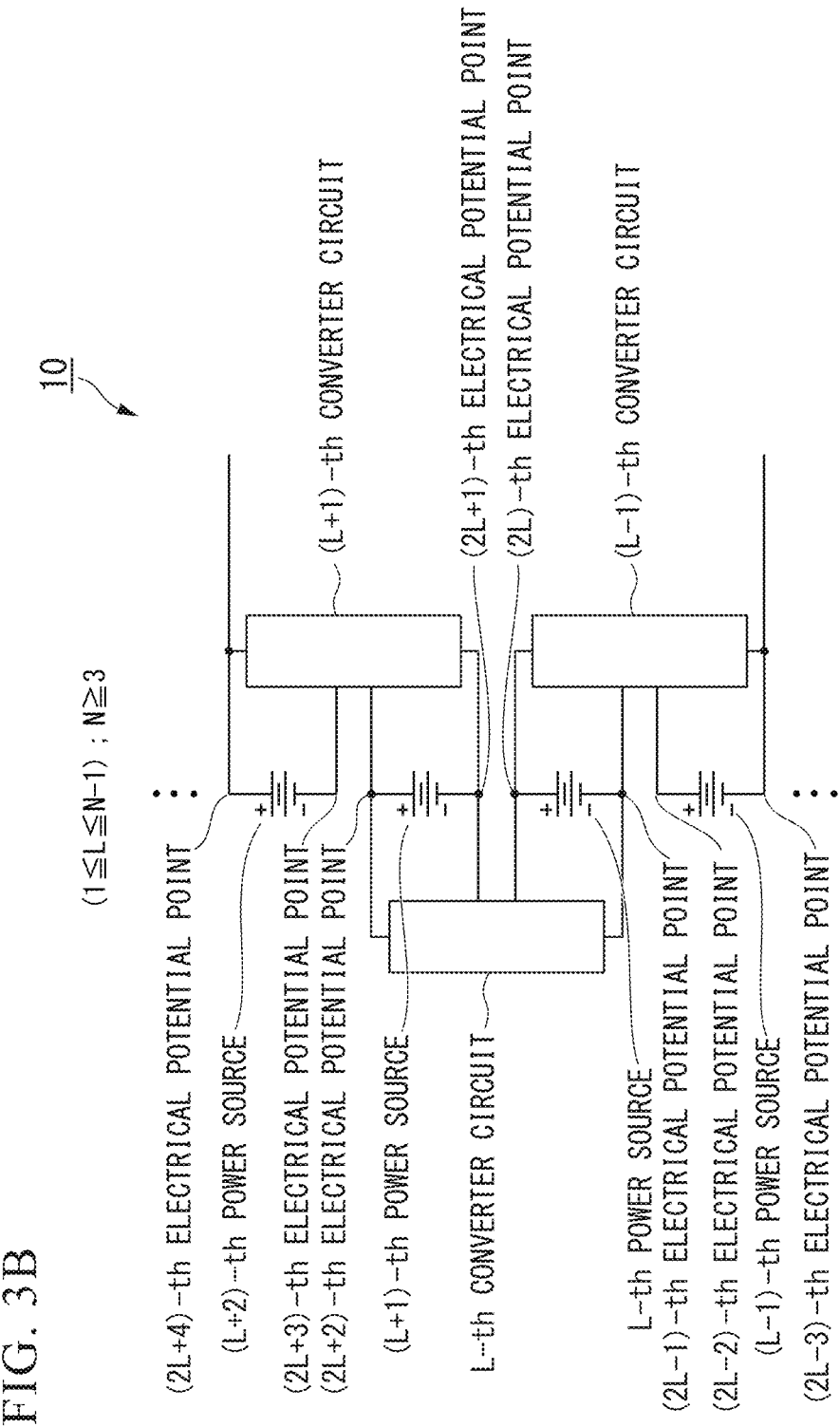

FIG. 9A    POWER MODE (VBa, VBb ≤ V0 ≤ VBa+VBb)
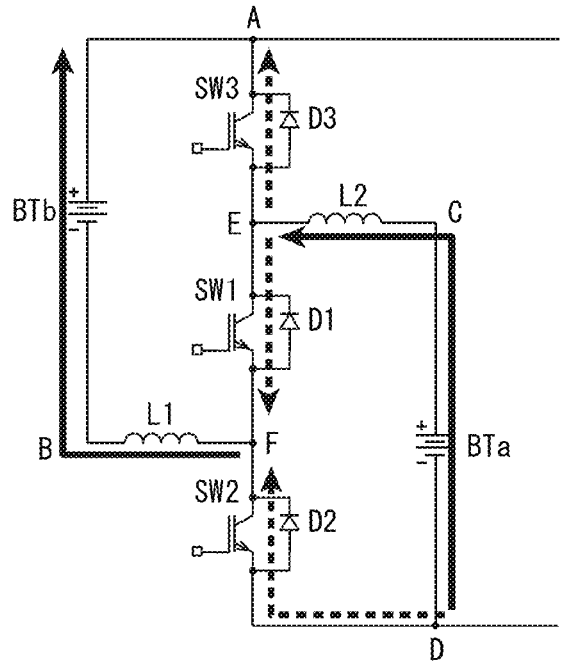
FIG. 9B    REGENERATIVE MODE (VBa, VBb ≤ V0 ≤ VBa+VBb)
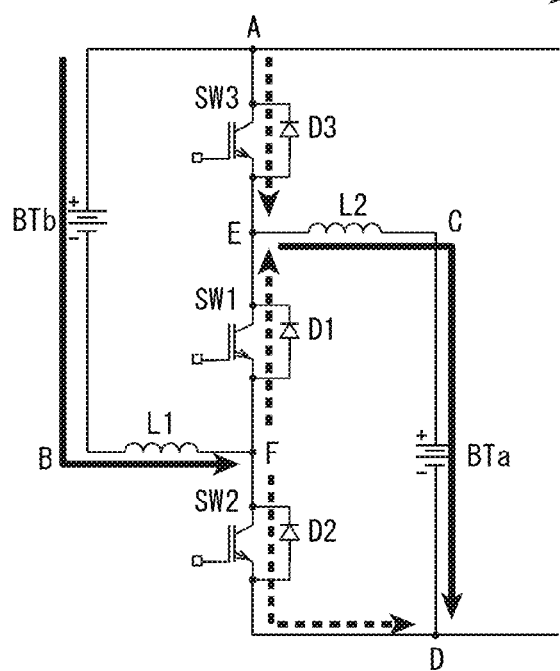

FIG. 12A  REG1, REG2: POWER MODE
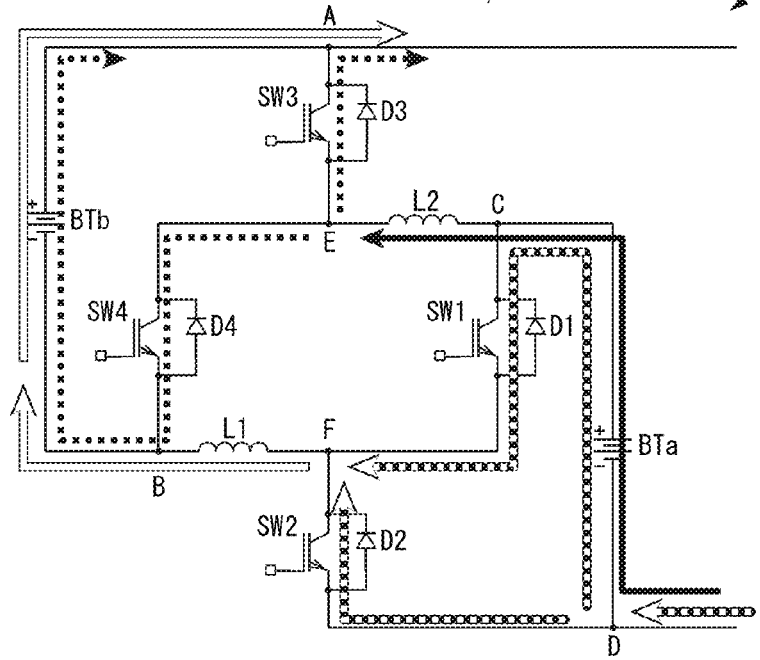
FIG. 12B  REG1, REG2: REGENERATIVE MODE
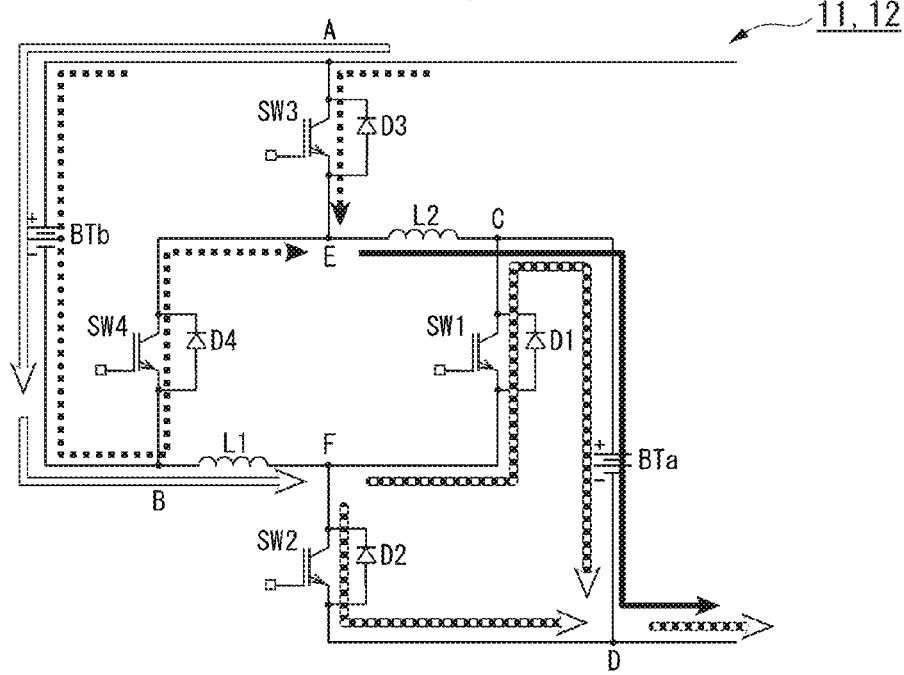

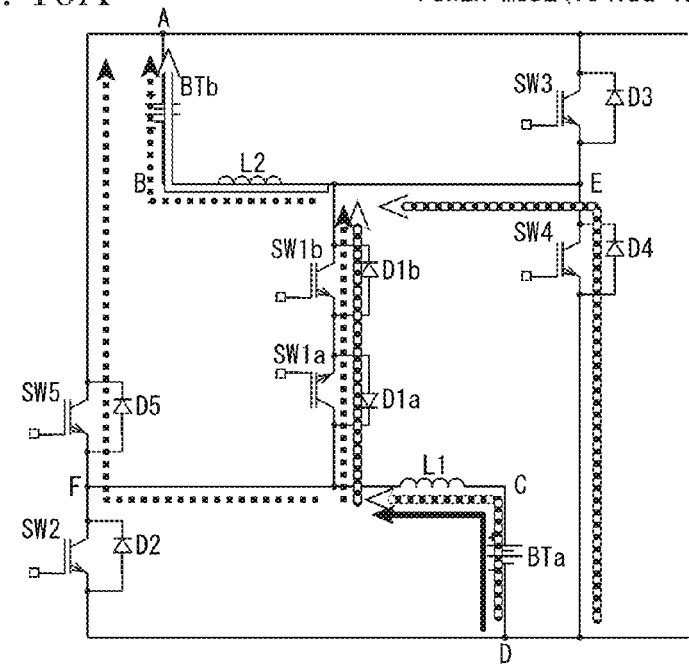
FIG. 16A   POWER MODE (V0<VBa+VBb)
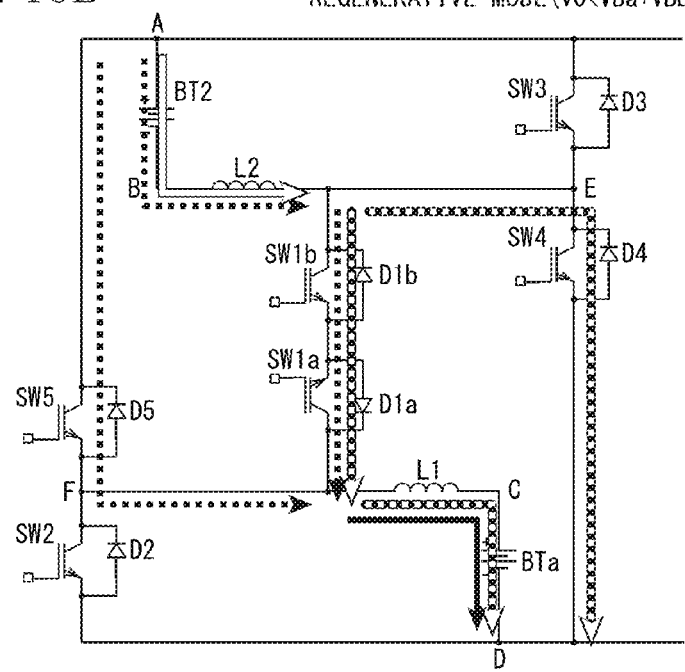
FIG. 16B   REGENERATIVE MODE (V0<VBa+VBb)

FIG. 16C  POWER MODE (VBa+VBb<V0)
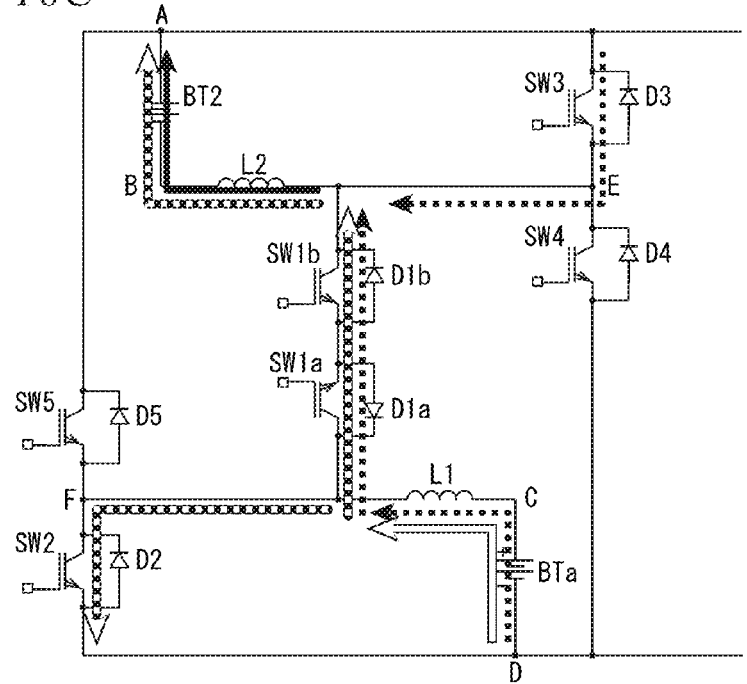
FIG. 16D  REGENERATIVE MODE (VBa+VBb<V0)
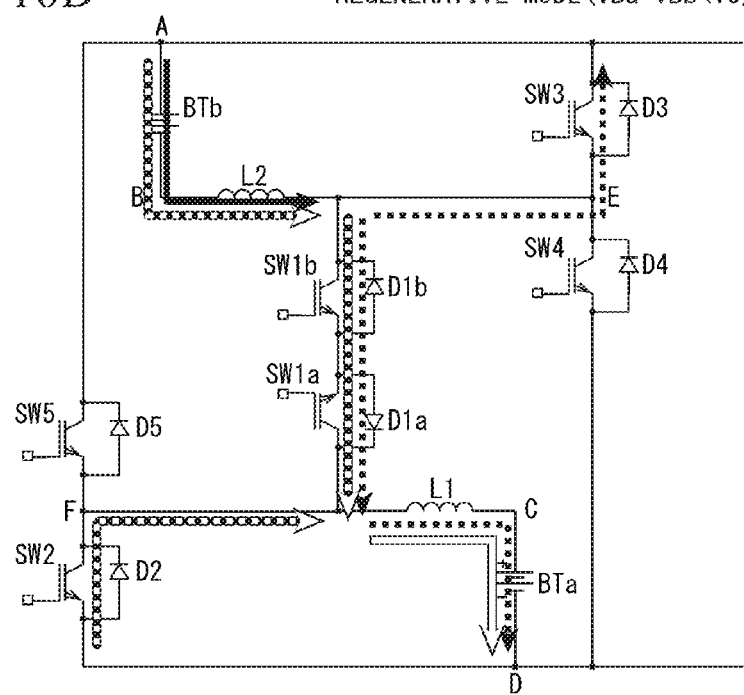

FIG. 18A          REG1, REG2:POWER MODE
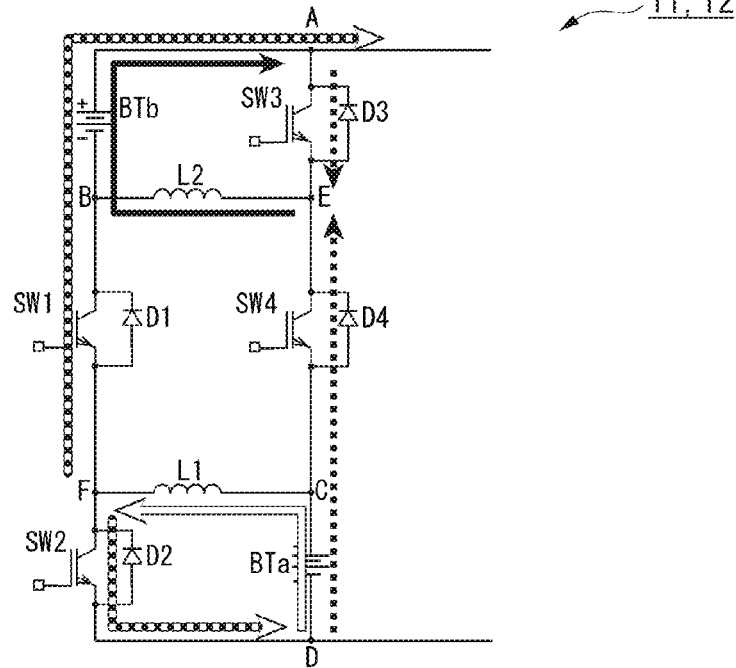
FIG. 18B          REG1, REG2:REGENERATIVE MODE
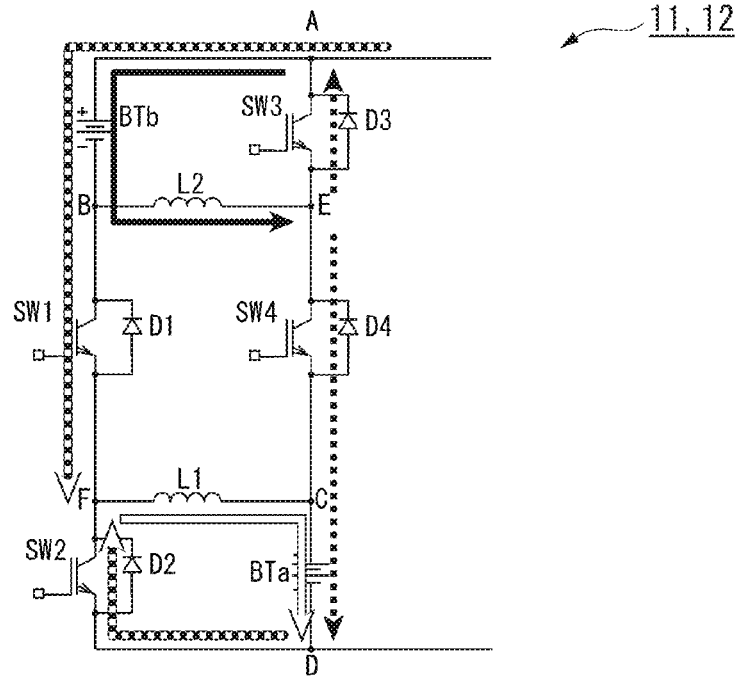

FIG. 23A  REG1, REG2: POWER MODE (V0<(VBa+VBb))
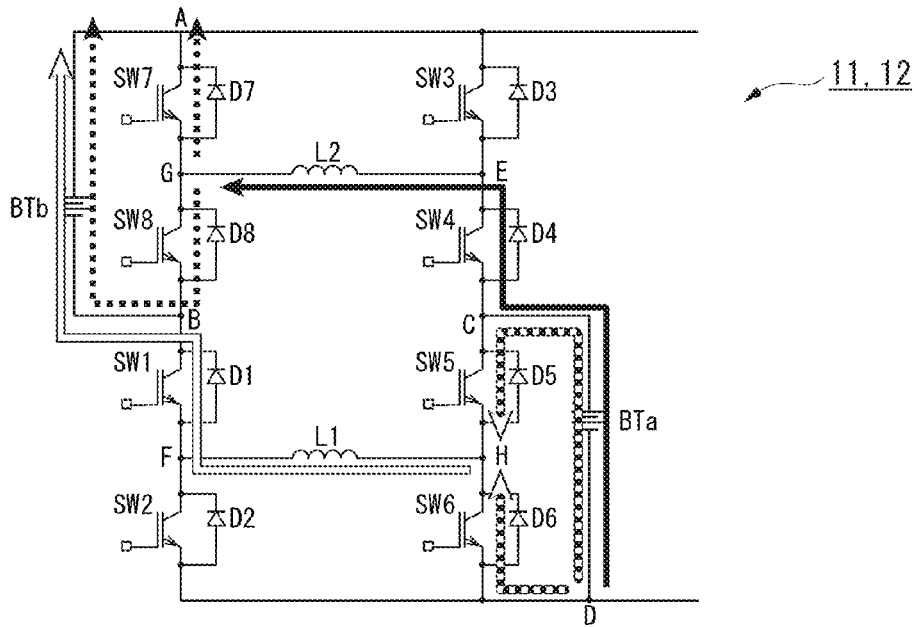
FIG. 23B  REG1, REG2: REGENERATIVE MODE (V0<(VBa+VBb))
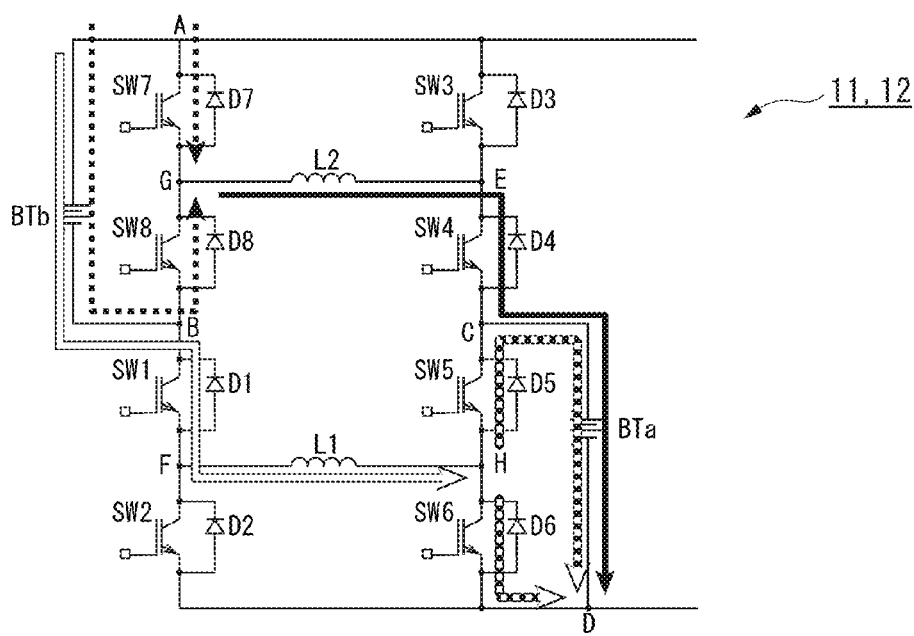

FIG. 23C    REG1, REG2:POWER MODE(VO>(VBa+VBb))
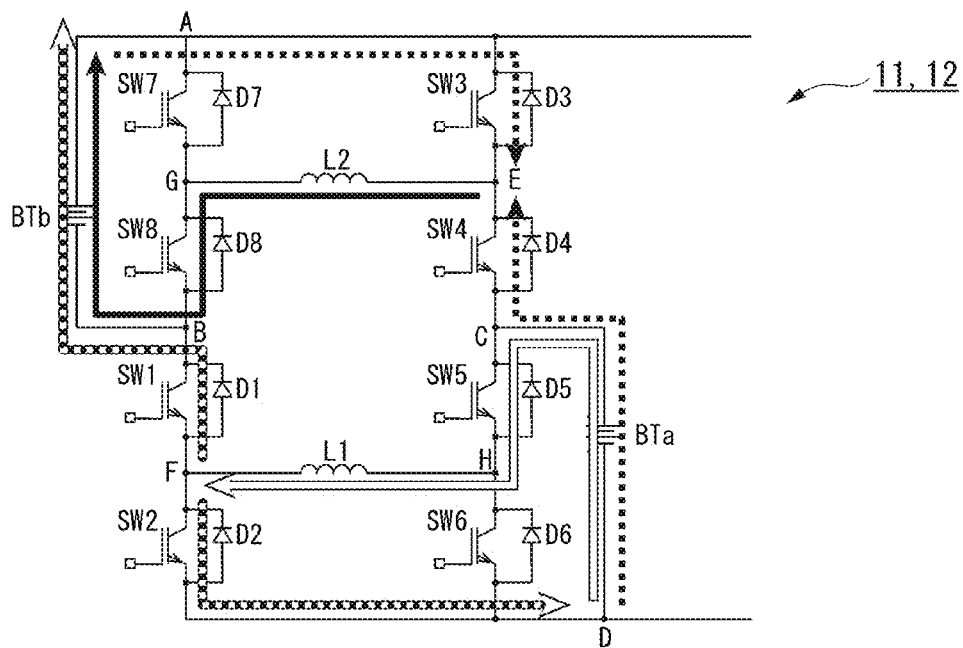
FIG. 23D    REG1, REG2:REGENERATIVE MODE(VO>(VBa+VBb))
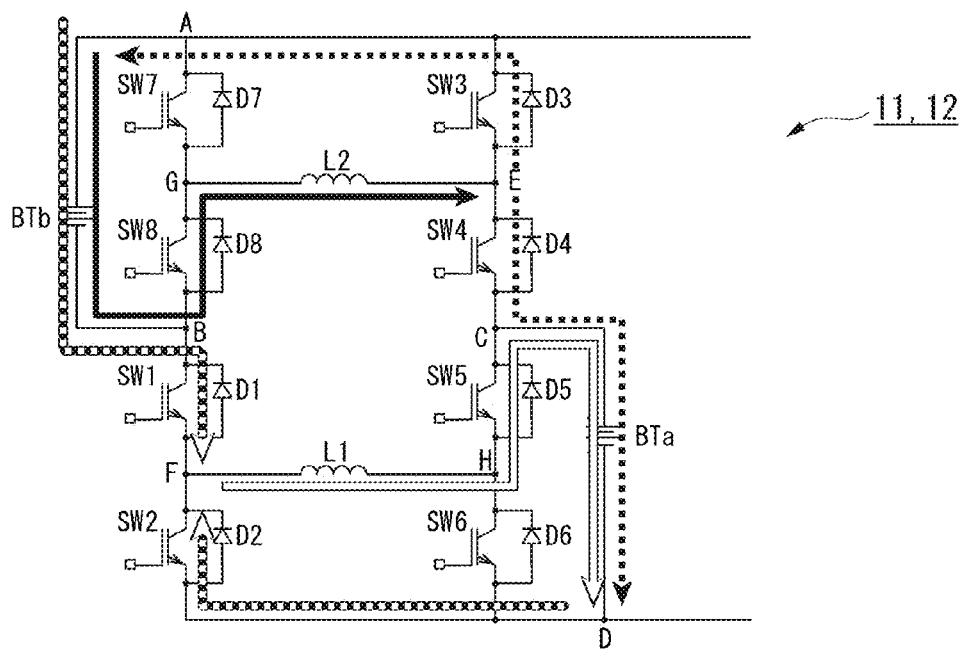

US 9,450,438 B2

POWER DEVICE

BACKGROUND OF THE INVENTION

1. Field of the Invention

The present invention relates to a power device. Priority is claimed on Japanese Patent Application No. 2013-119938, filed Jun. 6, 2013, the content of which is incorporated herein by reference.

2. Description of Related Art

A power system which includes a DC-DC converter, two switches including first and second switches, and two power sources including first and second power sources has been known. The power system switches between a serial connection state where the first and second power sources are connected in series and a parallel connection state where the first and second power sources are connected in parallel based on ON/OFF state of the first and second switches, and connects the first and second power sources in the serial connection state or the parallel connection state with an electrical load, while the power system adjusts a voltage applied to the electrical load using the DC-DC converter (for example, refer to Japanese Unexamined Patent Application, First Publication No. 2012-152079).

A power device which includes a step-up converter, four relays including first to fourth relays, and two secondary batteries has been known. The power device switches between a serial connection state where the two secondary batteries are connected in series and a parallel connection state where the two secondary batteries are connected in parallel based on ON/OFF state of the first to fourth relays, and connects the two secondary batteries in the serial connection state or the parallel connection state with an electrical load, while the power device adjusts a voltage applied to the electrical load using the step-up converter (for example, refer to Japanese Unexamined Patent Application, First Publication No. 2012-60838).

Operating points of the DC-DC converter (or the step-up converter) in the power system and power device of the related art described above are substantially limited to only two points including a first point where the first and second power sources (or secondary batteries) are connected in parallel and the step-up ratio is one and a second point where the first and second power sources (or the secondary batteries) are connected in series and the step-up ratio is two. Therefore, if the power system and power device are part of a vehicle, for example, from a small car to a large car, and the voltage is arbitrarily controlled to be in a desire voltage range, it is necessary to change characteristics of a power source or a voltage control device. Therefore, it is difficult to ensure the general versatility of the power system and power device.

The present invention provides a power device where the adjustable voltage range is large, and thereby, the general versatility is improved.

SUMMARY OF THE INVENTION (1) According to one aspect of the present invention, a power device may include at least three power sources which are a first power source, a second power source, and a third power source, a load which is configured to be driven by a power supplied from the power source, and a voltage control unit which is configured to control a voltage to be applied to the load. The voltage control unit may include several electrical potential points, and at least two converter circuits which are a first converter circuit and a second converter circuit. The several electrical potential points may include a first electrical potential point connected with a negative electrode of the first power source, a second electrical potential point connected with a positive electrode of the first power source, a third electrical potential point connected with a negative electrode of the second power source, a fourth electrical potential point connected with a positive electrode of the second power source, a fifth electrical potential point connected with a negative electrode of the third power source, and a sixth electrical potential point connected with a positive electrode of the third power source. The first converter circuit may be connected with the first electrical potential point, the second electrical potential point, the third electrical potential point, and the fourth electrical potential point. The second converter circuit may be connected with the third electrical potential point, the fourth electrical potential point, the fifth electrical potential point, and the sixth electrical potential point. The first converter circuit may be configured to at least one of (a) control a voltage, applied between the first electrical potential point and the fourth electrical potential point, to be within a range from a voltage of the first power source or a voltage of the second power source to a summed voltage of the voltage of the first power source and the voltage of the second power source, and (b) control the voltage, applied between the first electrical potential point and the fourth electrical potential point, to be equal to or more than the summed voltage of the voltage of the first power source and the voltage of the second power source. The second converter circuit may be configured to at least one of (a) control a voltage, applied between the third electrical potential point and the sixth electrical potential point, to be within a range from the voltage of the second power source or a voltage of the third power source to a summed voltage of the voltage of the second power source and the voltage of the third power source, and (b) control the voltage, applied between the third electrical potential point and the sixth electrical potential point, to be equal to or more than the summed voltage of the voltage of the second power source and the voltage of the third power source.

(2) According to another aspect of the present invention, a power device may include N power sources which are first to N-th power sources, where N is a natural number which is equal to or more than 3, a load which is configured to be driven by a power supplied from the power source, and a voltage control unit which is configured to control a voltage to be applied to the load. The voltage control unit may include (2N) electrical potential points which are first to (2N)-th electrical potential points, and (N−1) converter circuits which are first to (N−1)-th converter circuits. A negative electrode of the K-th power sources may be connected to the (2K−1)-th electrical potential point, where K is an arbitrary natural number which is equal or less than N. A positive electrode of the K-th power sources may be connected to the (2K)-th electrical potential point. The L-th converter circuit may be connected to the (2L−1)-th to (2L+2)-th electrical potential points, where L is an arbitrary natural number which is equal or less than (N−1). The L-th converter circuit may be configured to at least one of control a voltage, applied between the (2L−1)-th electrical potential point and the (2L+2)-th electrical potential point, to be within a range from a voltage of the L-th power source or a voltage of the (L+1)-th power source to a summed voltage of the voltage of the L-th power source and the voltage of the (L+1)-th power source, and control the voltage, applied between the (2L−1)-th electrical potential point and the (2L+2)-th electrical potential point, to be equal to or more than the summed voltage of the voltage of the voltage of the L-th power source and the voltage of the (L+1)-th power source.

(3) In the (2) described above, the power device may further include a second load which is connected with at least one of the first to (N−1)-th converter circuits.

(4) In the (2) or (3) described above, the power device may further include a third load which is connected with at least one of the first to N-th power sources in parallel.

(5) In one of the (2) to (4) described above, the power device may further include a fourth load having a first end and a second end. The first end of the fourth load may be connected with a first of a pair among the first to (2N)-th electrical potential points, and the second end of the fourth load may be connected with a second of the pair.

According to the aspect in the (1) or (2) described above, the power device can sequentially perform any voltage control within a desired voltage range from any one of the first voltage of the first power source, the second voltage of the second power source, and the third voltage of the third power source to a voltage which is equal to or more than the summed voltage of the first voltage of the first power source, the second voltage of the second power source, and the third voltage of the third power source. For example, the power device can be adapted easily to various systems by setting the number of the power sources and the number of the converter circuits which are adapted to the desired voltage range when the power device is designed. Therefore, the controllable voltage range is enlarged, and thereby the general versatility can be improved.

Furthermore, in the (3) described above, each voltage to be applied to the load and voltage to be applied to the second load can be arbitrarily controlled. Therefore, the general versatility with regard to the application to various systems can be improved.

Furthermore, in the (4) described above, each voltage to be applied to the load and voltage to be applied to the third load can be arbitrarily controlled. Therefore, the general versatility with regard to the application to various systems can be improved.

Furthermore, in the (5) described above, each voltage to be applied to the load and voltage to be applied to the fourth load can be arbitrarily controlled. Therefore, the general versatility with regard to the application to various systems can be improved.

BRIEF DESCRIPTION OF THE DRAWINGS

FIG. 3B is a diagram showing a main configuration of the power device according to the first variation of the embodiment of the present invention.

FIG. 9A is a diagram showing ON/OFF of each switching device and a current flow when the converter circuit according to the first example of the embodiment of the present invention is in a power mode.

FIG. 9B is a diagram showing ON/OFF of each switching device and a current flow when the converter circuit according to the first example of the embodiment of the present invention is in a regenerative mode.

FIG. 12A is a diagram showing ON/OFF of each switching device and a current flow when the converter circuit according to the second example of the embodiment of the present invention is in a power mode.

FIG. 12B is a diagram showing ON/OFF of each switching device and a current flow when the converter circuit according to the second example of the embodiment of the present invention is in a regenerative mode.

FIG. 16A is a diagram showing ON/OFF of each switching device and a current flow when the converter circuit according to the fourth example of the embodiment of the present invention is in a power mode.

FIG. 16B is a diagram showing ON/OFF of each switching device and a current flow when the converter circuit according to the fourth example of the embodiment of the present invention is in a regenerative mode.

FIG. 16C is a diagram showing ON/OFF of each switching device and a current flow when the converter circuit according to the fourth example of the embodiment of the present invention is in a power mode.

FIG. 16D is a diagram showing ON/OFF of each switching device and a current flow when the converter circuit according to the fourth example of the embodiment of the present invention is in a regenerative mode.

FIG. 18A is a diagram showing ON/OFF of each switching device and a current flow when the converter circuit according to the fifth example of the embodiment of the present invention is in a power mode.

FIG. 18B is a diagram showing ON/OFF of each switching device and a current flow when the converter circuit according to the fifth example of the embodiment of the present invention is in a regenerative mode.

FIG. 23A is a diagram showing ON/OFF of each switching device and a current flow when the converter circuit according to the seventh example of the embodiment of the present invention is in a power mode.

FIG. 23B is a diagram showing ON/OFF of each switching device and a current flow when the converter circuit according to the seventh example of the embodiment of the present invention is in a regenerative mode.

FIG. 23C is a diagram showing ON/OFF of each switching device and a current flow when the converter circuit according to the seventh example of the embodiment of the present invention is in a power mode.

FIG. 23D is a diagram showing ON/OFF of each switching device and a current flow when the converter circuit according to the seventh example of the embodiment of the present invention is in a regenerative mode.

DESCRIPTION OF EMBODIMENTS

Hereinafter, a power device according to an embodiment of the present invention will be described with reference to the attached drawings.

The power device according to the embodiment of the present invention provides a direct-current power to a load such as an inverter. The inverter controls the power mode and the regenerative mode of an electric motor which can produce, for example, a drive force to run a vehicle.

Figure 1:
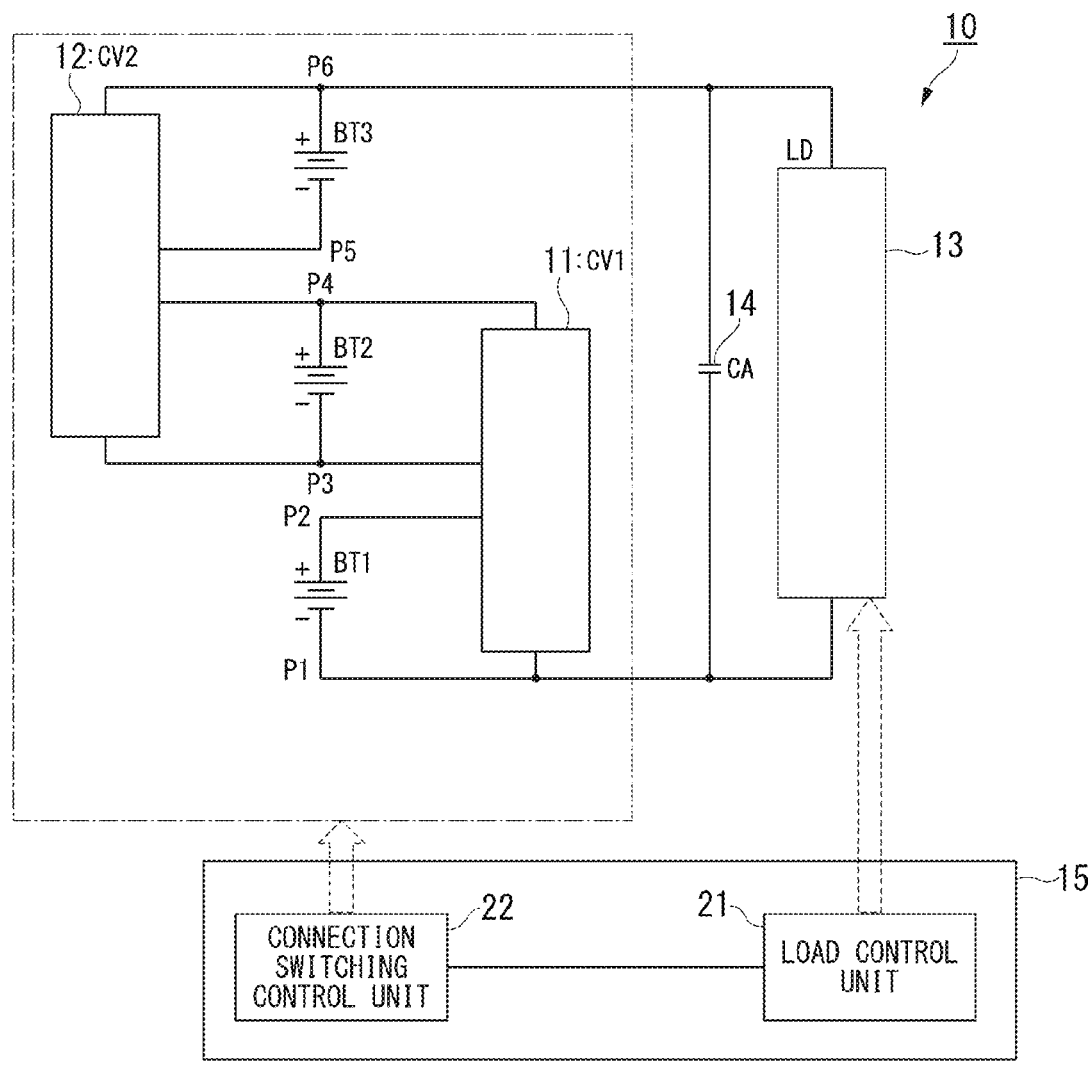
FIG. 1 is a configuration diagram showing a power device according to an embodiment of the present invention.

As illustrated in FIG. 1, a power device 10 according to the embodiment of the present invention includes a first power source BT1, a second power source BT2, and a third power source BT3, such as a battery, a first converter circuit (CV1) 11, a second converter circuit (CV2) 12, a load (LD) 13, a capacitor (CA) 14, and a control device 15. The load 13 can drive using a direct-current power supplied from the first and second converter circuits 11 and 12, and supply a generated direct-current power to the first and second converter circuits 11 and 12. The capacitor (CA) 14 is connected with both ends of the load 13.

The power device 10 includes a first electrical potential point P1 to a sixth electrical potential point P6.

The first electrical potential point P1 is connected with a negative electrode of the first power source BT1, and the second electrical potential point P2 is connected with a positive electrode of the first power source BT1. The third electrical potential point P3 is connected with a negative electrode of the second power source BT2, and the fourth electrical potential point P4 is connected with a positive electrode of the second power source BT2. The fifth electrical potential point P5 is connected with a negative electrode of the third power source BT3, and the sixth electrical potential point P6 is connected with a positive electrode of the third power source BT3.

The first converter circuit 11 is connected with the first electrical potential point P1, the second electrical potential point P2, the third electrical potential point P3, and the fourth electrical potential point P4, and the second converter circuit 12 is connected with the third electrical potential point P3, the fourth electrical potential point P4, the fifth electrical potential point P5, and the sixth electrical potential point P6.

As discussed later, the first and second converter circuits 11 and 12 include at least step-down or step-up direct-current power converter circuit, and are controlled based on signals output from the control device 15 so that the first and second converter circuits 11 and 12 can drive independently from each other.

The first converter circuit 11 controls a voltage, applied between the first electrical potential point P1 and the fourth electrical potential point P4, to be within a range from a first voltage VB1 of the first power source BT1 or a second voltage VB2 of the second power source BT2 to a summed voltage (VB1+VB2) of the first voltage VB1 of the first power source BT1 and the second voltage VB2 of the second power source BT2, and/or controls the voltage, applied between the first electrical potential point P1 and the fourth electrical potential point P4, to be equal to or more than the summed voltage (VB1+VB2) of the first voltage VB1 of the first power source BT1 and the second voltage VB2 of the second power source BT2.

The second converter circuit 12 controls a voltage, applied between the third electrical potential point P3 and the sixth electrical potential point P6, to be within a range from a second voltage VB2 of the second power source BT2 or a third voltage VB3 of the third power source BT3 to a summed voltage (VB2+VB3) of the second voltage VB2 of the second power source BT2 and the third voltage VB3 of the third power source BT3, and/or controls the voltage, applied between the third electrical potential point P3 and the sixth electrical potential point P6, to be equal to or more than the summed voltage (VB2+VB3) of the second voltage VB2 of the second power source BT2 and the third voltage VB3 of the third power source BT3.

The control device 15 includes a load control unit 21 and a connection switching control unit 22.

The load control unit 21 controls the operation of the load 13. For example, if the load 13 includes an electric motor such as a three-phase brushless DC motor and an inverter to control the power mode and regenerative mode of the electric motor, the load control unit 21 controls a power conversion operation of the inverter. In detail, when the electric motor is in a power mode, the load control unit 21 converts a direct-current power applied between both electrodes at the direct current side of the inverter into a three-phase alternating-current power, performs a commutation of a conduction for each phase of the electric motor sequentially, and thereby, each phase current, which is alternating-current, flows. On the other hand, when the electric motor is in a regenerative mode, the load control unit 21 converts the generated alternating-current power output from the electric motor into a direct-current power, while the load control unit 21 synchronizes based on a rotation angle of the electric motor.

The connection switching control unit 22 can drive the first and second converter circuits 11 and 12 independently from each other by inputting signals (PWM signals) based on pulse width modulation (PWM) into a gate of each switching device provided in the first and second converter circuits 11 and 12.

As described above, the power device 10 according to the embodiment of the present invention can sequentially perform any voltage control within a desired voltage range from any one of the first voltage VB1 of the first power source BT1, the second voltage VB2 of the second power source BT2, and the third voltage VB3 of the third power source BT3 to a voltage which is equal to or more than the summed voltage (VB1+VB2+VB3) of the first voltage VB1 of the first power source BT1, the second voltage VB2 of the second power source BT2, and the third voltage VB3 of the third power source BT3.

Thereby, for example, the power device 10 can be adapted easily to various systems by setting the number of the power sources and the number of the converter circuits which are adapted to the desired voltage range when the power device 10 is designed. Therefore, the controllable voltage range is enlarged, and thereby, the general versatility can be improved.

(First Variation)

In the embodiment described above, as a first variation illustrated in FIG. 2, the power device 10 may include more than four power sources and more than three converter circuits without being limited to three power sources including the first to third power sources BT1 to BT3 and two converter circuits including the first and second converter circuits 11 and 12.

Figure 2:
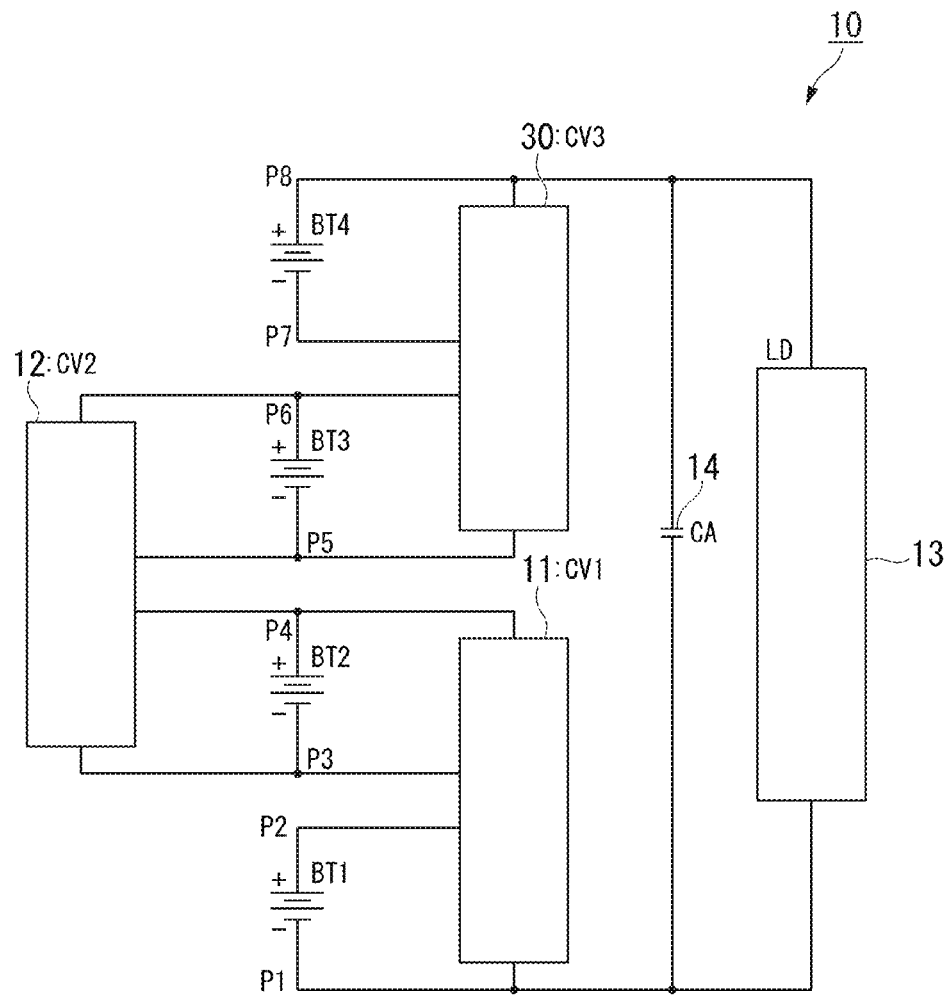
FIG. 2 is a configuration diagram showing a power device according to a first variation of the embodiment of the present invention.

For example, a power device 10 according to the first variation illustrated in FIG. 2 further includes a fourth power source BT4, a third converter circuit (CV3) 30, a seventh electrical potential point P7, and an eighth electrical potential point P8 compared to the embodiment described above.

The seventh electrical potential point P7 is connected with a negative electrode of the fourth power source BT4, and the eighth electrical potential point P8 is connected with a positive electrode of the fourth power source BT4. The third converter circuit 30 is connected with the fifth electrical potential point P5, the sixth electrical potential point P6, the seventh electrical potential point P7, and the eighth electrical potential point P8.

As discussed later, the third converter circuit 30 includes at least step-down or step-up direct-current power converter circuit, and is controlled based on signals output from the control device 15 so that the third converter circuit 30 drives independently.

The third converter circuit 30 controls a voltage, applied between the fifth electrical potential point P5 and the eighth electrical potential point P8, to be within a range from a third voltage VB3 of the third power source BT3 or a fourth voltage VB4 of the fourth power source BT4 to a summed voltage (VB3+VB4) of the third voltage VB3 of the third power source BT3 and the fourth voltage VB4 of the fourth power source BT4, and/or controls the voltage, applied between the fifth electrical potential point P5 and the eighth electrical potential point P8, to be equal to or more than the summed voltage (VB3+VB4) of the third voltage VB3 of the third power source BT3 and the fourth voltage VB4 of the fourth power source BT4.

In other words, the power device 10 includes N power sources including first to N-th power sources BT1, . . . , BTN, (2*N) electrical potential points including first to (2*N)-th electrical potential points P1, . . . , P(2*N), and (N−1) converter circuits including first to (N−1)-th converter circuits CV1, . . . , CV(N−1). N is a natural number which is equal to or more than 3, K is an arbitrary natural number which is equal to or less than the natural number N (1≤K≤N), and L is an arbitrary natural number which is equal to or less than (the natural number N−1) (1≤L≤N−1).

Figure 3A:
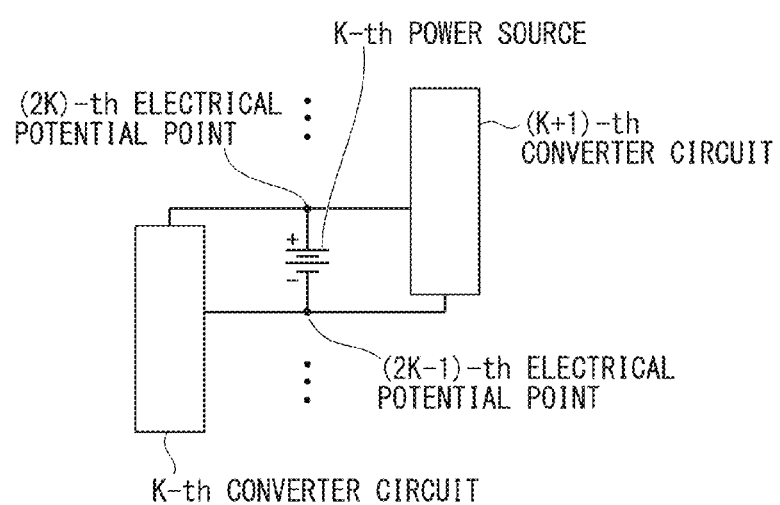
FIG. 3A is a diagram showing a main configuration of the power device according to the first variation of the embodiment of the present invention.

As illustrated in FIG. 3A, a negative electrode of the K-th power source is connected with the (2*K−1)-th electrical potential point, and a positive electrode of the K-th power source is connected with the (2*K)-th electrical potential point.

As illustrated in FIG. 3B, the L-th converter circuit CVL is connected with the (2L−1)-th to (2L+2)-th electrical potential points. The L-th converter circuit CVL controls a voltage, applied between the (2L−1)-th electrical potential point and the (2L+2)-th electrical potential point, to be within a range from a voltage of the L-th power source BTL or a voltage of the (L+1)-th power source BT(L+1) to a summed voltage of the voltage of the L-th power source BTL and the voltage of the (L+1)-th power source BT(L+1), and/or controls the voltage, applied between the (2L−1)-th electrical potential point and the (2L+2)-th electrical potential point, to be equal to or more than the summed voltage of the voltage of the L-th power source BTL and the voltage of the (L+1)-th power source BT(L+1).

The power device 10 according to the first variation can sequentially perform any voltage control within a desired voltage range from any one of the voltages of the first to N-th power sources BT1, . . . , BTN to a voltage which is equal to or more than the summed voltage of the first to N-th power sources BT1, . . . , BTN.

Thereby, for example, the power device 10 can be adapted easily to various systems by setting the number of the power sources and the number of the converter circuits which are adapted to the desired voltage range when the power device 10 is designed. Therefore, the controllable voltage range is enlarged, and thereby, the general versatility can be improved.

(Second Variation)

In the embodiment and the first variation described above, the power device 10 may include, in addition to the load 13, at least one second load 31 connected with at least one of the converter circuits in parallel.

Figure 4:
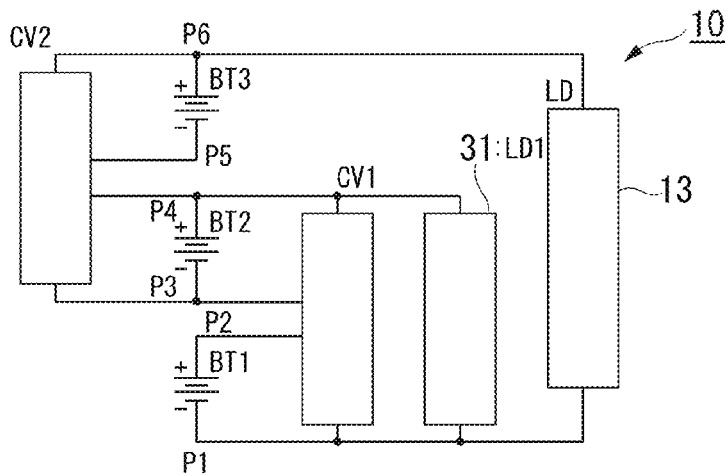
FIG. 4 is a configuration diagram showing a power device according to a second variation of the embodiment of the present invention.

For example, in a second variation illustrated in FIG. 4, a second load 31 (LD1) is connected with the first converter circuit 11 in parallel. In this case, a voltage applied to the load 13 is arbitrarily controllable based on the operations of the first and second converter circuits 11 and 12, and a voltage applied to the load 31 is also arbitrarily controllable.

In more detail, for example, if the first to third voltages VB1 to VB3 are the same (VB1=VB2=VB3=VB), a voltage V123 applied to the load 13 is represented by V123=VB*(RT1+RT2−1), and a voltage V12 applied to the second load 31 is represented by V12=V1*RT1. RT1 is the step-up ratio of the first converter circuit 11, and RT2 is the step-up ratio of the second converter circuit 12. Thereby, the voltage V123 applied to the load 13 is controllable so that the step-up ratio of each power source BT1 to BT3 to the voltage VB is arbitrarily set within a range from 1 to 3, and the voltage V12 applied to the second load 31 is controllable so that the step-up ratio of each power source BT1 to BT3 to the voltage VB is arbitrarily set within a range from 1 to 2.

According to the second variation, for example, in a hybrid vehicle equipped with two electric motors including first and second electric motors, if the load 13 is the first electric motor and the second load 31 is the second electric motor, each of the voltages applied to the first and second electric motors is arbitrarily controllable.

(Third Variation)

In the embodiment and the first and second variations described above, the power device 10 may include, in addition to the load 13, at least one third load 32 connected with at least one of the power sources in parallel.

Figure 5:
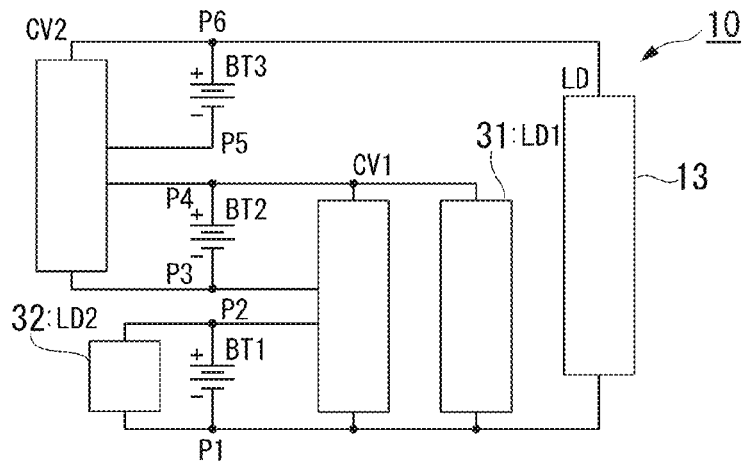
FIG. 5 is a configuration diagram showing a power device according to a third variation of the embodiment of the present invention.

For example, in a third variation illustrated in FIG. 5, in addition to the first load 13 and the second load 31 connected with the first converter circuit 11 in parallel, a third load 32 (LD2) is connected with the first power source BT1 in parallel. According to the third variation, for example, in a hybrid vehicle which is equipped with the two electric motors including the first and second electric motors and is connectable with an external charger, the load 13 is the first electric motor, the second load 31 is the second electric motor, and the third load 32 is the external charger. By driving the power device 10 so that the step-up ratio of the first and second converter circuits 11 and 12 is equal to 1, charging power can be equally supplied to each power source BT1 to BT3 without the need to increase the output voltage of the external charger.

(Fourth Variation)

In the embodiment and the first, second, and third variations described above, the power device 10 may include a fourth load 33 in addition to the load 13. One end of the fourth load 33 may be connected with a first of a pair among the several electrical potential points, and the other end of the fourth load 33 may be connected with a second of the pair.

Figure 6:
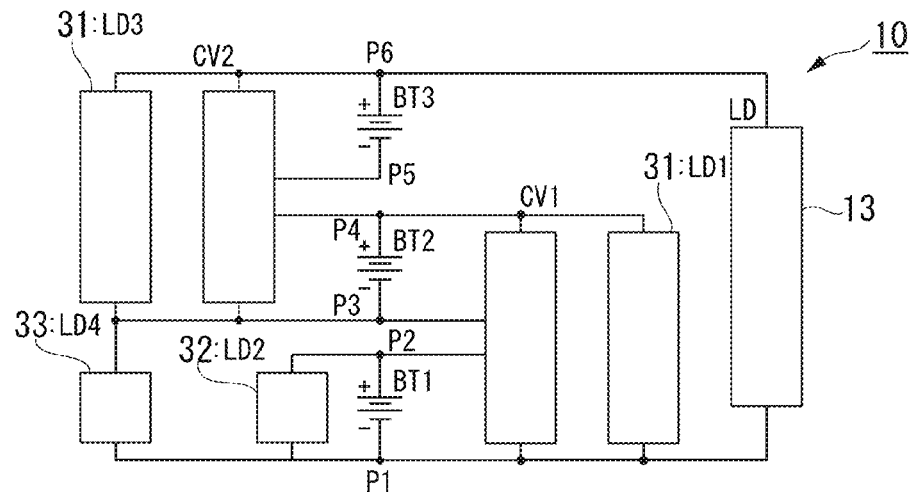
FIG. 6 is a configuration diagram showing a power device according to a fourth variation of the embodiment of the present invention.

For example, in a fourth variation illustrated in FIG. 6, in addition to the load 13, the second load 31 (LD1, LD3) connected with each first and second converter circuit 11 and 12 in parallel, and the third load 32 (LD2) connected with the first power source BT1 in parallel, one end of a fourth load 33 (LD4) is connected with the first electrical potential point P1 and the other end of the fourth load 33 (LD4) is connected with the third electrical potential point P3. In this case, the voltage applied to each load 13, 31, 32, and 33 is arbitrarily controllable based on the operations of the first and second converter circuits 11 and 12.

First Example

Hereinafter, a power device 10 according to a first example of the embodiment described above will be described with reference to the attached drawings.

Figure 7:
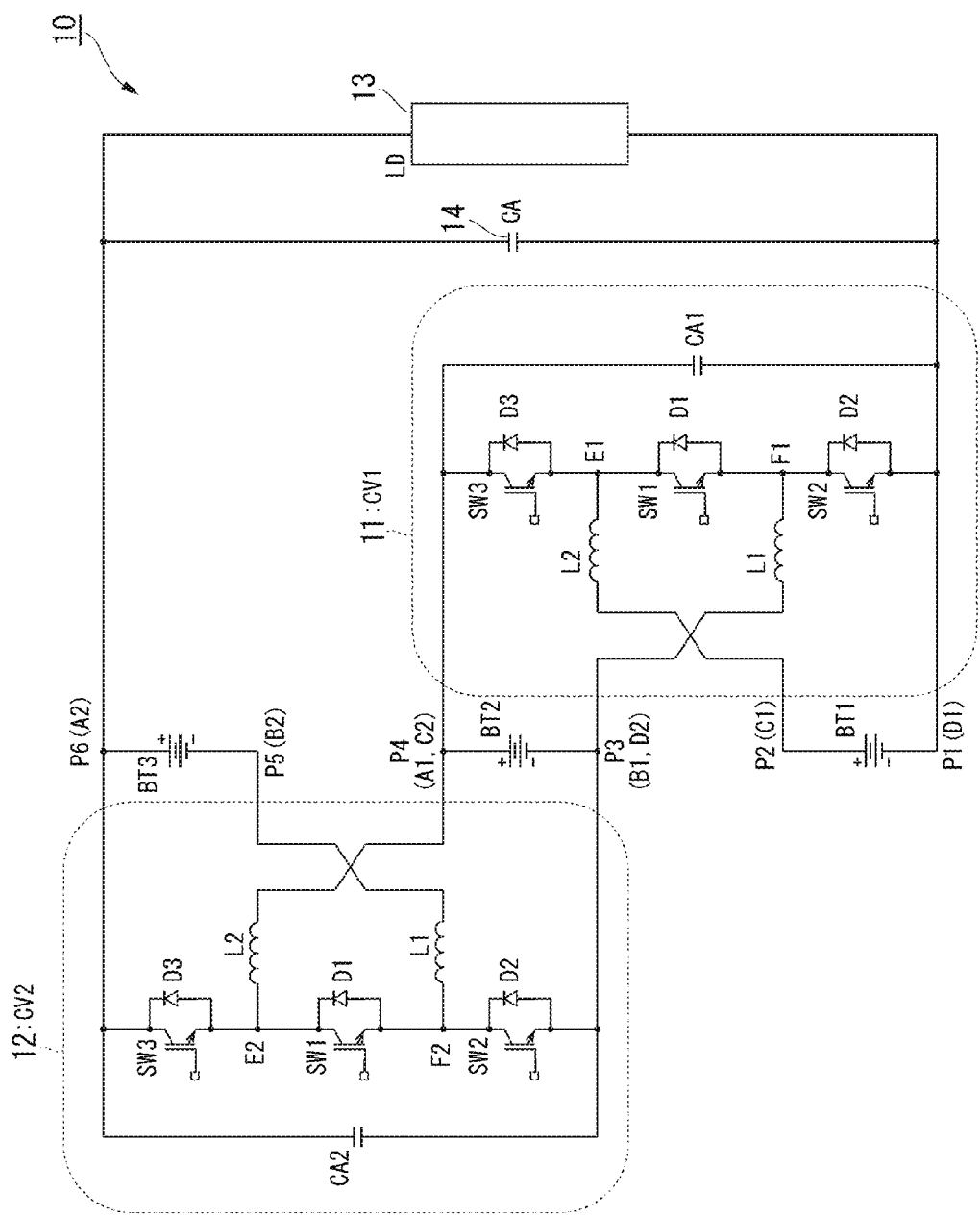
FIG. 7 is a configuration diagram showing a power device according to a first example of the embodiment of the present invention.
Figure 8A:
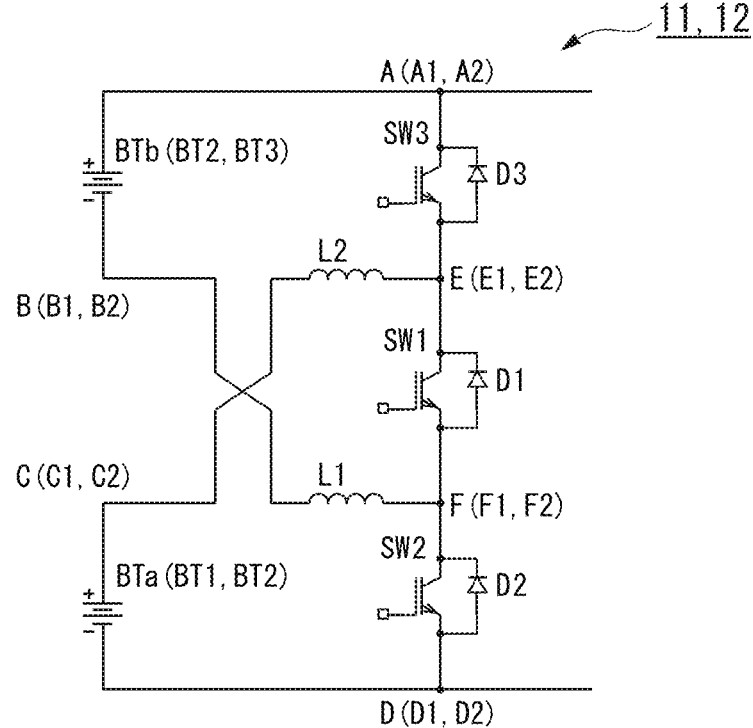
FIG. 8A is a configuration diagram showing a converter circuit according to the first example of the embodiment of the present invention.
Figure 8B:
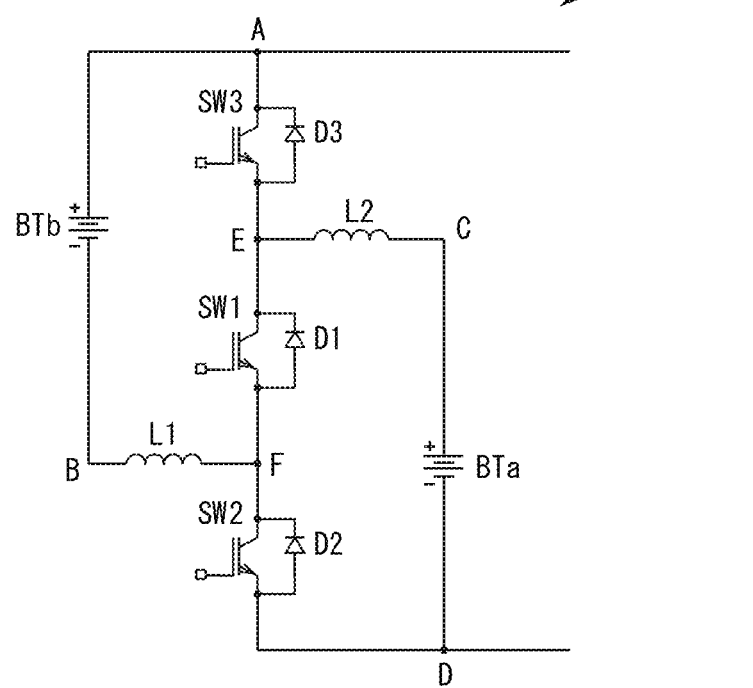
FIG. 8B is a configuration diagram showing a converter circuit according to the first example of the embodiment of the present invention.

The power device 10 according to the first example includes first and second converter circuits 11 and 12 as illustrated in FIGS. 7 and 8A. As illustrated in FIGS. 8A and 8B, the first and second converter circuits 11 and 12 are the same, and include first to third switching devices SW1 to SW3 such as IGBT (Insulated Gate Bipolar mode Transistor), first and second reactors L1 and L2, and first to sixth nodes A to F.

A capacitor CA1 is connected between a first electrical potential point P1 and a fourth electrical potential point P4 in the first converter circuit 11, and a capacitor CA2 is connected between a third electrical potential point P3 and a sixth electrical potential point P6 in the second converter circuit 12. Each capacitor CA1 and CA2 may be omitted.

A positive electrode of the second power source BTb (the second power source BT2 in the first converter circuit 11, or the third power source BT3 in the second converter circuit 12) is connected with the first node A (A1 in the first converter circuit 11, or A2 in the second converter circuit 12), and a negative electrode of the second power source BTb is connected with the second node B (B1 in the first converter circuit 11, or B2 in the second converter circuit 12).

A positive electrode of the first power source BTa (the first power source BT1 in the first converter circuit 11, or the second power source BT2 in the second converter circuit 12) is connected with the third node C (C1 in the first converter circuit 11, or C2 in the second converter circuit 12), and a negative electrode of the first power source BTa is connected with the fourth node D (D1 in the first converter circuit 11, or D2 in the second converter circuit 12).

One end of the second reactor L2 is connected with the fifth node E (E1 in the first converter circuit 11, or E2 in the second converter circuit 12) and the other end of the second reactor L2 is connected with the third node C (C1 in the first converter circuit 11, or C2 in the second converter circuit 12).

One end of the first reactor L1 is connected with the sixth node F (F1 in the first converter circuit 11, or F2 in the second converter circuit 12) and the other end of the first reactor L1 is connected with the second node B (B1 in the first converter circuit 11, or B2 in the second converter circuit 12).

A collector and an emitter of the first switching device SW1 are connected with the fifth node E and the sixth node F, respectively. A collector and an emitter of the second switching device SW2 are connected with the sixth node F and the fourth node D, respectively. A collector and an emitter of the third switching device SW3 are connected with the first node A and the fifth node E, respectively. Diodes D1 to D3 are connected between the emitter and collector of the switching devices SW1 to SW3, respectively. The direction from the emitter to the collector of each switching device SW1 to SW3 is a forward direction of each diode D1 to D3.

A first electrical potential point P1 is the same as the fourth node D1, a second electrical potential point P2 is the same as the third node C1, a third electrical potential point P3 is the same as the second node B1 and the fourth node D2, a fourth electrical potential point P4 is the same as the first node A1 and the third node C2, a fifth electrical potential point P5 is the same as the second node B2, and a sixth electrical potential point P6 is the same as the second node A2.

The first and second converter circuits 11 and 12 are controlled based on pulse-width-modulated signals (PWM signals) output from the control device 15 and input into a gate of each switching device SW1 to SW3 so that the first and second converter circuits 11 and 12 drive independently from each other.

In more detail, each first and second converter circuit 11 and 12 is controlled so that the first switching device SW1 and the second and third switching devices SW2 and SW3 are switched. In this switching operation, close (ON) and open (OFF) of each switching device SW1 to SW3 are switched alternately.

For example, as illustrated in FIGS. 9A and 9B, in a power mode where direct-current power is supplied to the load 13 and in a regenerative mode where direct-current power is supplied from the load 13, the first switching device SW1 is turned off and the second and third switching devices SW2 and SW3 are turned on. Thereby, the first and second power sources BTa and BTb are connected in parallel between the first node A and the fourth node D. On the other hand, the first and second power sources BTa and BTb are connected in series between the first node A and the fourth node D by having the first switching device SW1 tuned on and the second and third switching devices SW2 and SW3 turned off.

A connection switching control unit 22 included in the control device 15 controls a switching operation of each the first to third switching device SW1 to SW3 based on a duty DT. In the switching operation, the first switching device SW1 and the second and third switching devices SW2 and SW3 are inverted and the alternative close and open (ON/OFF) switching operations of each switching device SW1 to SW3 are performed for each first and second converter circuit 11 and 12. The duty is defined by ON time t(SW1) of the first switching device SW1 and ON time t(SW2&SW3) of the second and third switching devices SW2 and SW3. The connection switching control unit 22 arbitrarily controls a voltage V0, applied between the first node A and the fourth node D, to be between the voltage of the first power source BTa or the second power source BTb and the summed voltage of the first and second power sources BTa and BTb by increasing and decreasing the duty DT every the first and second converter circuits 11 and 12.

Thereby, for example, if the first to third voltages VB1 to VB3 are the same (VB1=VB2=VB3=VB), the step-up ratio of the voltage applied to the load 13 is controlled to be set at an arbitrary value between 1 to 3.

Second Example

Hereinafter, a power device 10 according to a second example of the embodiment described above will be described with reference to the attached drawings.

Figure 10:
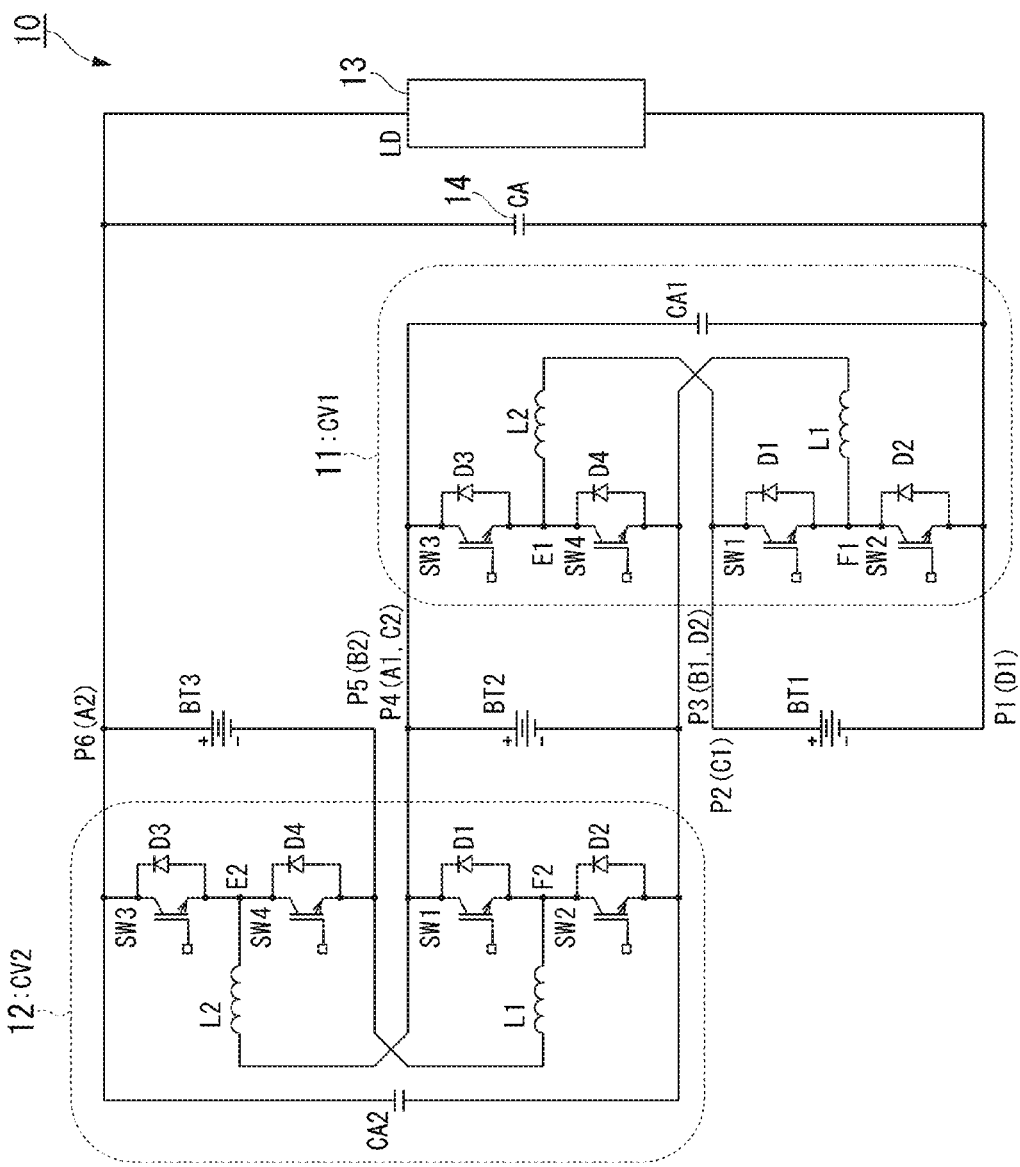
FIG. 10 is a configuration diagram showing a power device according to a second example of the embodiment of the present invention.
Figure 11A:
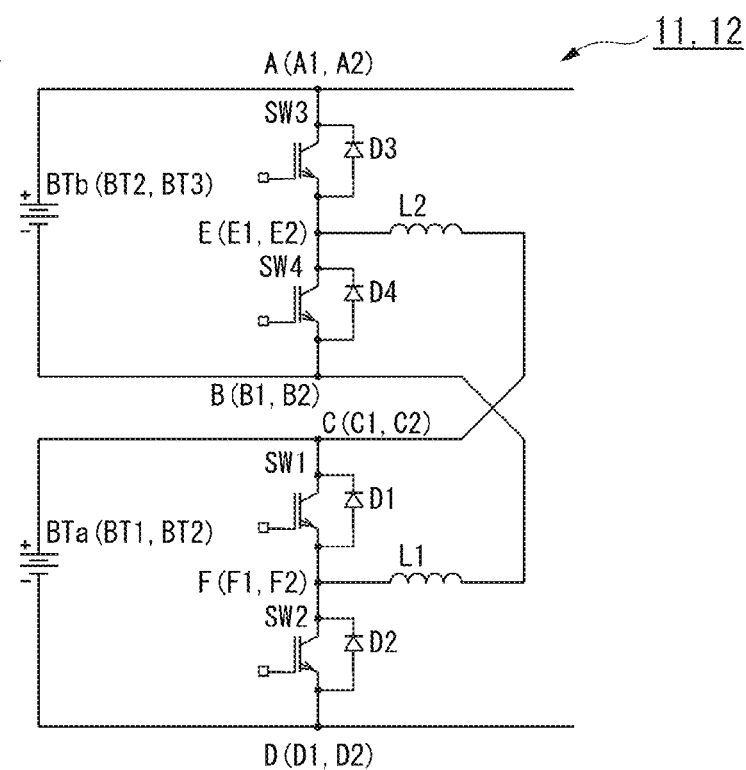
FIG. 11A is a configuration diagram showing a converter circuit according to the second example of the embodiment of the present invention.
Figure 11B:
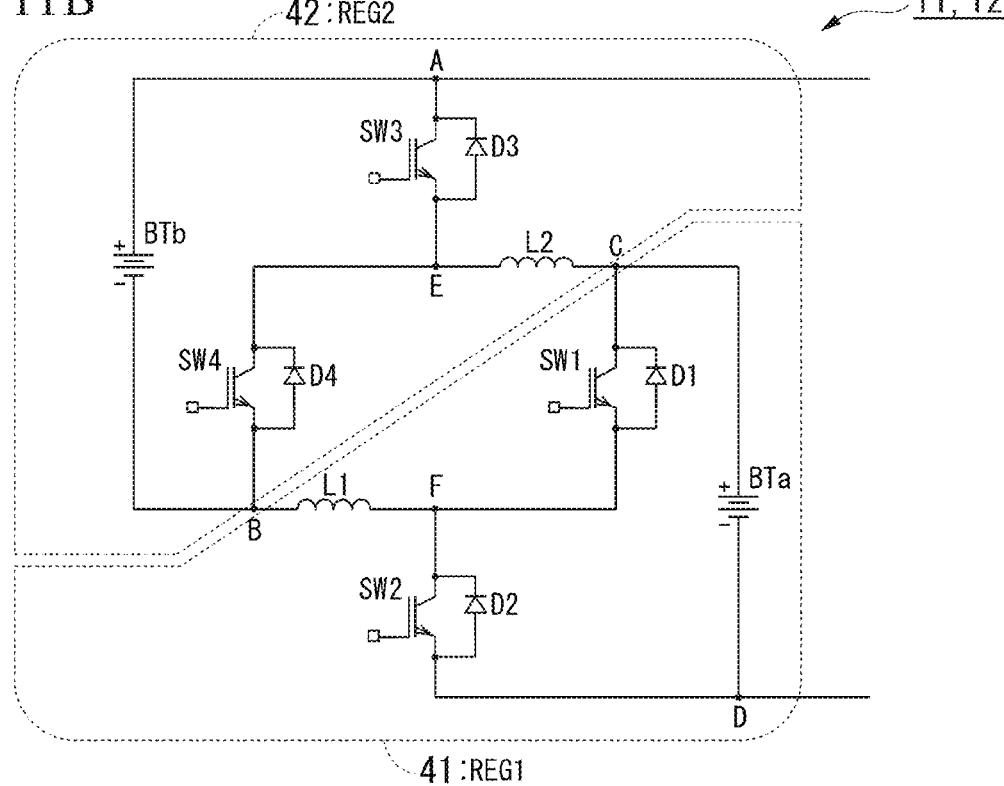
FIG. 11B is a configuration diagram showing a converter circuit according to the second example of the embodiment of the present invention.

The power device 10 according to the second example includes first and second converter circuits 11 and 12 as illustrated in FIGS. 10 and 11A. As illustrated in FIGS. 11A and 11B, the first and second converter circuits 11 and 12 are the same, and include first to fourth switching devices SW1 to SW4 such as IGBT, first and second reactors L1 and L2, and first to sixth nodes A to F.

A capacitor CA1 is connected between a first electrical potential point P1 and a fourth electrical potential point P4 in the first converter circuit 11, and a capacitor CA2 is connected between a third electrical potential point P3 and a sixth electrical potential point P6 in the second converter circuit 12. Each capacitor CA1 and CA2 may be omitted.

A positive electrode of a second power source BTb (a second power source BT2 in the first converter circuit 11, or a third power source BT3 in the second converter circuit 12) is connected with the first node A (A1 in the first converter circuit 11, or A2 in the second converter circuit 12), and a negative electrode of the second power source BTb is connected with the second node B (B1 in the first converter circuit 11, or B2 in the second converter circuit 12).

A positive electrode of the first power source BTa (a first power source BT1 in the first converter circuit 11, or the second power source BT2 in the second converter circuit 12) is connected with the third node C (C1 in the first converter circuit 11, or C2 in the second converter circuit 12), and a negative electrode of the first power source BTa is connected with the fourth node D (D1 in the first converter circuit 11, or D2 in the second converter circuit 12).

One end of the second reactor L2 is connected with the fifth node E (E1 in the first converter circuit 11, or E2 in the second converter circuit 12) and the other end of the second reactor L2 is connected with the third node C (C1 in the first converter circuit 11, or C2 in the second converter circuit 12).

One end of the first reactor L1 is connected with the sixth node F (F1 in the first converter circuit 11, or F2 in the second converter circuit 12) and the other end of the first reactor L1 is connected with the second node B (B1 in the first converter circuit 11, or B2 in the second converter circuit 12).

A collector and an emitter of the first switching device SW1 are connected with the third node C and the sixth node F, respectively. A collector and an emitter of the second switching device SW2 are connected with the sixth node F and the fourth node D, respectively. A collector and an emitter of the third switching device SW3 are connected with the first node A and the fifth node E, respectively. A collector and an emitter of the fourth switching device SW4 are connected with the fifth node E and the second node B, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

A first electrical potential point P1 is the same as the fourth node D1, a second electrical potential point P2 is the same as the third node C1, a third electrical potential point P3 is the same as the second node B1 and the fourth node D2, a fourth electrical potential point P4 is the same as the first node A1 and the third node C2, a fifth electrical potential point P5 is the same as the second node B2, and a sixth electrical potential point P6 is the same as the first node A2.

As illustrated in FIG. 11B, the first converter circuit 11 and the second converter circuit 12 include a first direct-current power converter circuit (REG1) 41 and a second direct-current power converter circuit (REG2) 42, respectively.

The first direct-current power converter circuit (REG1) 41 includes the first and second switching devices SW1 and SW2, and the first reactor L1.

The second direct-current power converter circuit (REG2) 42 includes the third and fourth switching devices SW3 and SW4, and the second reactor L2.

The first and second converter circuits 11 and 12 are controlled so that the first and second converter circuits 11 and 12 drive independently from each other based on pulse-width-modulated signals (PWM signals) output from a control device 15 and input into a gate of each switching device SW1 to SW4.

In more detail, each first and second converter circuit 11 and 12 is controlled so that a switching operation for at least one of a pair of the first and second switching devices SW1 and SW2 included in the first direct-current power converter circuit 41 and a pair of the third and fourth switching devices SW3 and SW4 included in the second direct-current power converter circuit 42 is performed. In this switching operation, close (ON) and open (OFF) of each switching device SW1 to SW4 are switched alternately.

For example, as illustrated in FIGS. 12A and 12B, a connection switching control unit 22 included in the control device 15 controls a switching operation of the first switching device SW1 and the second switching device SW2 included in the first direct-current power converter circuit 41 based on a first duty DT1. In the switching operation, the first switching device SW1 and the second switching device SW2 are inverted and the alternative close and open (ON/OFF) switching operations of each switching device SW1 and SW2 are performed for each first and second converter circuit 11 and 12. The first duty DT1 is defined by ON time t(SW1) of the first switching device SW1 and ON time t(SW2) of the second switching device SW2. The connection switching control unit 22 can step down a first voltage VBa of the first power source BTa based on the first duty DT1 and output the step-down voltage from the first direct-current power converter circuit 41. The connection switching control unit 22 controls output voltage V10 of the first direct-current power converter circuit 41 (in other words, the voltage applied between a second node B and a fourth node D) as the product of the first voltage VBa and the first duty DT1 (VBa*DT1=V10).

For example, as illustrated in FIGS. 12A and 12B, the connection switching control unit 22 controls a switching operation of the third switching device SW3 and the fourth switching device SW4 included in the second direct-current power converter circuit 42 based on a second duty DT2. In the switching operation, the third switching device SW3 and the fourth switching device SW4 are inverted and the alternative close and open (ON/OFF) switching operations of each switching device SW3 and SW4 are performed for each first and second converter circuit 11 and 12. The second duty DT2 is defined by ON time t(SW3) of the third switching device SW3 and ON time t(SW4) of the fourth switching device SW4. The connection switching control unit 22 can step down a second voltage VBb of the second power source BTb based on the second duty DT2 and output the step-down voltage from the second direct-current power converter circuit 42. The connection switching control unit 22 controls output voltage V20 of the second direct-current power converter circuit 42 (in other words, the voltage applied between the first node A and the third node C) as the product of the second voltage VBb and the second duty DT2 (VBb*DT2=V20).

Thereby, the connection switching control unit 22 controls arbitrarily the voltage V0, applied between the first node A and the fourth node D, every the first and second converter circuits 11 and 12 so that the voltage V0 is within a range from the first voltage BTa or the second voltage BTb to a summed voltage of the first voltage BTa or the second voltage BTb.

Thereby, for example, if the first to third voltages VB1 to VB3 are the same (VB1=VB2=VB3=VB), the step-up ratio of the voltage applied to the load 13 is controlled to be set at an arbitrary value between 1 to 3.

Third Example

Hereinafter, a power device 10 according to a third example of the embodiment described above will be described with reference to the attached drawings.

Figure 13:
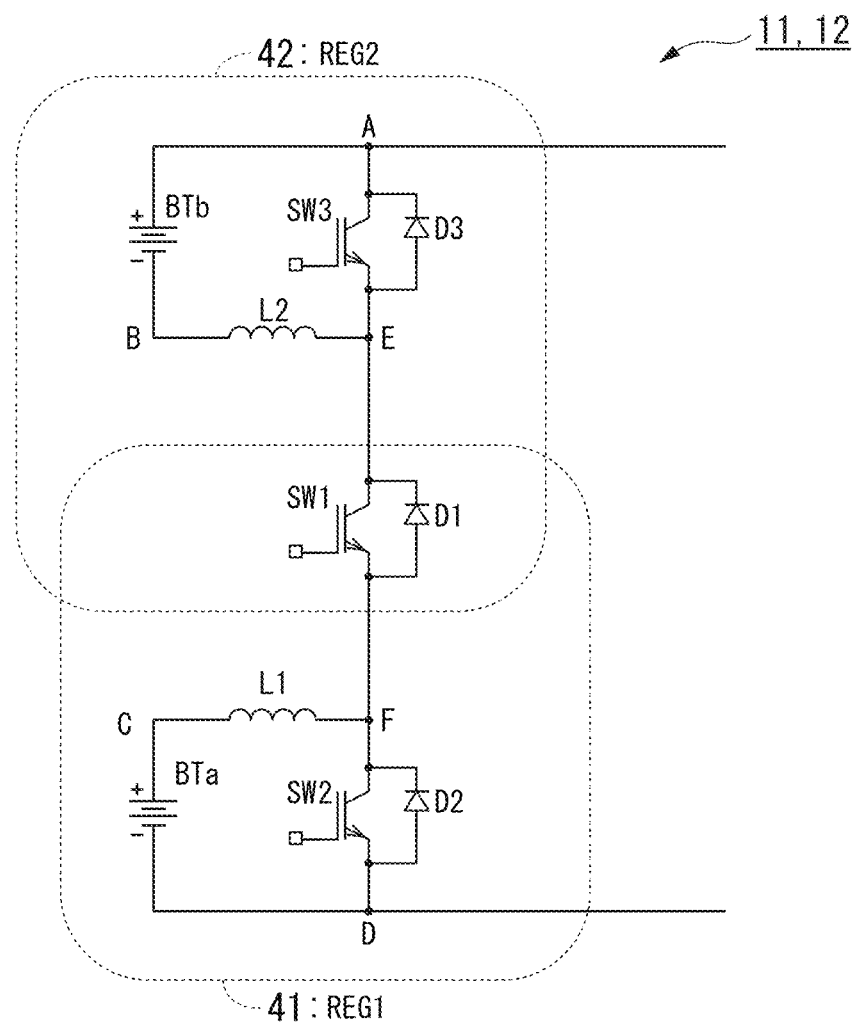
FIG. 13 is a configuration diagram showing a converter circuit according to a third example of the embodiment of the present invention.

The power device 10 according to the third example includes first and second converter circuits 11 and 12 as illustrated in FIG. 13. The first and second converter circuits 11 and 12 are the same. The first and second converter circuits 11 and 12 include first to sixth nodes A to F, a first direct-current power converter circuit (REG1) 41 and a second direct-current power converter circuit (REG2) 42. The first direct-current power converter circuit (REG1) 41 includes first and second switching devices SW1 and SW2 such as IGBT, and a first reactor L1. The second direct-current power converter circuit (REG2) 42 includes the first switching device SW1 and a third switching device SW3 such as IGBT, and a second reactor L2.

A positive electrode of a second power source BTb (a second power source BT2 in the first converter circuit 11, or a third power source BT3 in the second converter circuit 12) is connected with the first node A, a negative electrode of the second power source BTb is connected with the second node B, a positive electrode of a first power source BTa (a first power source BT1 in the first converter circuit 11, or a second power source BT2 in the second converter circuit 12) is connected with the third node C, and a negative electrode of the first power source BTa is connected with the fourth node D. One end of the second reactor L2 is connected with the fifth node E and the other end of the second reactor L2 is connected with the second node B. One end of the first reactor L1 is connected with the sixth node F and the other end of the first reactor L1 is connected with the third node C.

A collector and an emitter of the first switching device SW1 are connected with the fifth node E and the sixth node F, respectively. A collector and an emitter of the second switching device SW2 are connected with the sixth node F and the fourth node D, respectively. A collector and an emitter of the third switching device SW3 are connected with the first node A and the fifth node E, respectively. Diodes D1 to D3 are connected between the emitter and collector of the switching devices SW1 to SW3, respectively. The direction from the emitter to the collector of each switching device SW1 to SW3 is a forward direction of each diode D1 to D3.

Figure 14A:
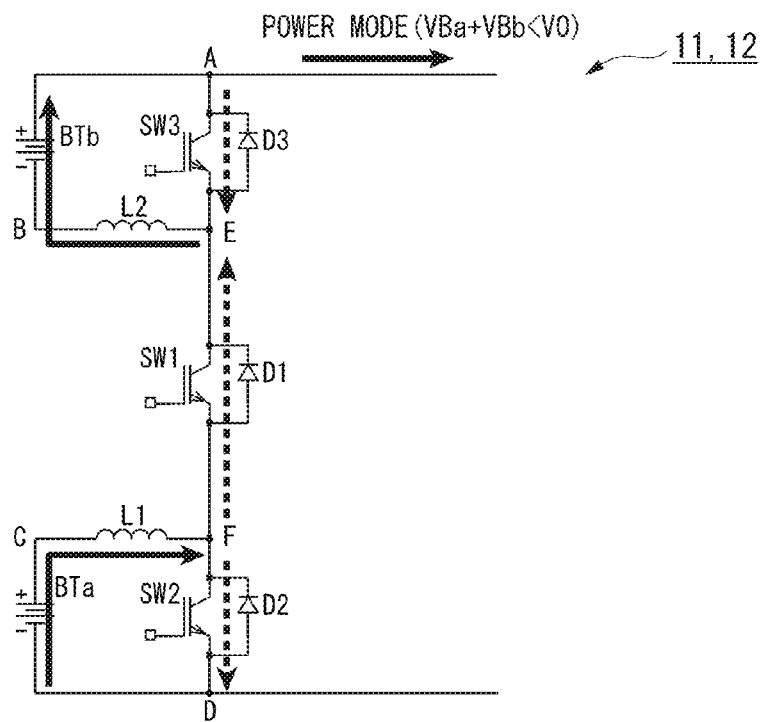
FIG. 14A is a diagram showing ON/OFF of each switching device and a current flow when the converter circuit according to the third example of the embodiment of the present invention is in a power mode.
Figure 14B:
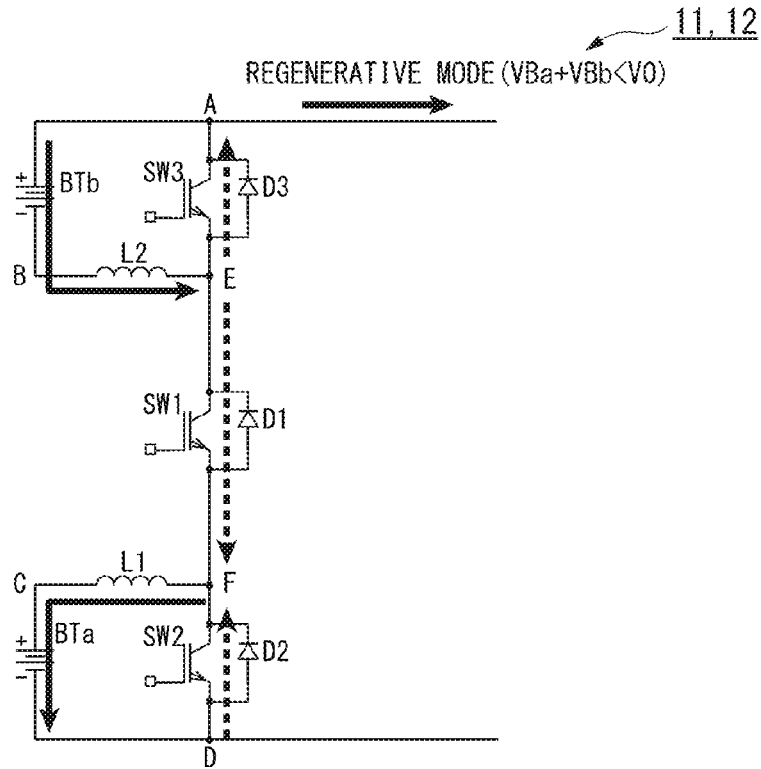
FIG. 14B is a diagram showing ON/OFF of each switching device and a current flow when the converter circuit according to the third example of the embodiment of the present invention is in a regenerative mode.

As illustrated in FIGS. 14A and 14B, a connection switching control unit 22 included in a control device 15 controls a switching operation of the first switching device SW1 and the second switching device SW2 included in the first direct-current power converter circuit 41 based on a first duty DT1. In the switching operation, the first switching device SW1 and the second switching device SW2 are inverted and the alternative close and open (ON/OFF) switching operations of each switching device SW1 and SW2 are performed for each first and second converter circuit 11 and 12. The first duty DT1 is defined by ON time t(SW1) of the first switching device SW1 and ON time t(SW2) of the second switching device SW2. The connection switching control unit 22 can step up a first voltage VBa of the first power source BTa based on the first duty DT1 and output the step-up voltage from the first direct-current power converter circuit 41. The connection switching control unit 22 controls output voltage V10 of the first direct-current power converter circuit 41 (in other words, the voltage applied between a fifth node E and a fourth node D) based on the first voltage VBa and the first duty DT1.

As illustrated in FIGS. 14A and 14B, the connection switching control unit 22 controls a switching operation of the first switching device SW1 and the third switching device SW3 included in the second direct-current power converter circuit 42 based on a second duty DT2. In the switching operation, the first switching device SW1 and the third switching device SW3 are inverted and the alternative close and open (ON/OFF) switching operations of each switching device SW1 and SW3 are performed for each first and second converter circuit 11 and 12. The second duty DT2 is defined by ON time t(SW1) of the first switching device SW1 and ON time t(SW3) of the third switching device SW3. The connection switching control unit 22 can step up a second voltage VBb of the second power source BTb based on the second duty DT2 and output the step-up voltage from the second direct-current power converter circuit 42. The connection switching control unit 22 controls output voltage V20 of the second direct-current power converter circuit 42 (in other words, the voltage applied between the first node A and the sixth node F) based on the second voltage VBb and the second duty DT2.

Thereby, the connection switching control unit 22 controls arbitrarily voltage V0, applied between the first node A and the fourth node D, every the first and second converter circuits 11 and 12 so that the voltage V0 is equal to or more than the summed voltage of the first voltage VBa and the second voltage VBb.

Thereby, the voltage applied to the load 13 is controlled to be set at an arbitrary value which is equal to or more than the summed voltage of the first to third voltage VB 1 to VB3 (VB1+VB2+VB3).

Fourth Example

Hereinafter, a power device 10 according to a fourth example of the embodiment described above will be described with reference to the attached drawings.

Figure 15:
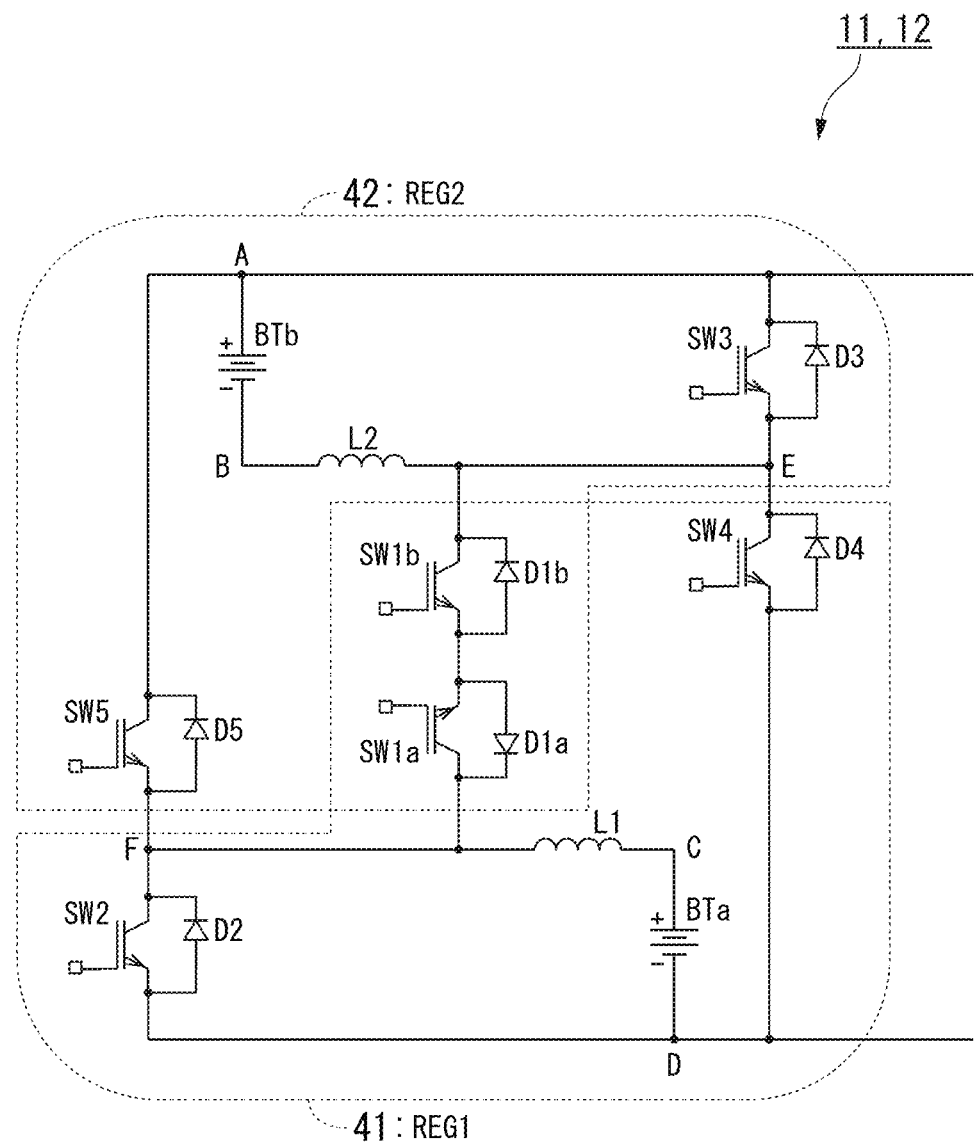
FIG. 15 is a configuration diagram showing a converter circuit according to a fourth example of the embodiment of the present invention.

As illustrated in FIG. 15, each first and second converter circuit 11 and 12 of the power device 10 according to the fourth example includes a switching device SW1 which is a bidirectional switch, instead of the switching device SW1 of the third example, and further includes fourth and fifth switching devices SW4 and SW5.

A first direct-current power converter circuit (REG1) 41 includes the first switching device SW1, a second switching device SW2, the fourth switching device SW4, and a first reactor L1.

A second direct-current power converter circuit (REG2) 42 includes the first switching device SW1, a third switching device SW3, the fifth switching device SW5, and a second reactor L2.

For example, the first switching device SW1, which is a bidirectional switch, includes two switching devices SW1a and SW1b. These two switching devices SW1a and SW1b are connected in series to have opposite polarities.

A collector and an emitter of the fourth switching device SW4 are connected with a fifth node E and a fourth node D, respectively. A collector and an emitter of the fifth switching device SW5 are connected with a first node A and a sixth node F, respectively. A diode D4 is connected between the emitter and collector of the fourth switching device SW4, and a diode D5 is connected between the emitter and collector of the fifth switching device SW5. The direction from the emitter to the collector of each switching device SW4 and SW5 is a forward direction of each diode D4 and D5.

As illustrated in FIGS. 16A and 16B, a connection switching control unit 22 included in a control device 15 controls a switching operation of the first switching device SW1 and the fourth switching device SW4 included in the first direct-current power converter circuit 41 based on a first step-down duty DT11. In the switching operation, the first switching device SW1 and the fourth switching device SW4 are inverted and the alternative close and open (ON/OFF) switching operations of each switching device SW1 and SW4 are performed for each first and second converter circuit 11 and 12. The first step-down duty DT11 is defined by ON time t(SW1) of the first switching device SW1 and ON time t(SW4) of the fourth switching device SW4. The connection switching control unit 22 can step down a first voltage VBa based on the first step-down duty DT11 and output the step-down voltage from the first direct-current power converter circuit 41. The connection switching control unit 22 controls output voltage V10a of the first direct-current power converter circuit 41 (in other words, the voltage applied between the fifth node E and the fourth node D) as the product of the first voltage VBa and the first step-down duty DT11 (VBa*DT11=V10a).

As illustrated in FIGS. 16A and 16B, the connection switching control unit 22 controls a switching operation of the first switching device SW1 and the fifth switching device SW5 included in the second direct-current power converter circuit 42 based on a second step-down duty DT21. In the switching operation, the first switching device SW1 and the fifth switching device SW5 are inverted and the alternative close and open (ON/OFF) switching operations of each switching device SW1 and SW5 are performed for each first and second converter circuit 11 and 12. The second step-down duty DT21 is defined by ON time t(SW1) of the first switching device SW1 and ON time t(SW5) of the fifth switching device SW5. The connection switching control unit 22 can step down a second voltage VBb based on the second step-down duty DT21 and output the step-down voltage from the second direct-current power converter circuit 42. The connection switching control unit 22 controls output voltage V20a of the second direct-current power converter circuit 42 (in other words, the voltage applied between the first node A and the sixth node F) as the product of the second voltage VBb and the second step-down duty DT21 (VBb*DT21=V20a).

Thereby, the connection switching control unit 22 controls arbitrarily a voltage V0, applied between the first node A and the fourth node D, to be between the voltage of the first power source BTa or the second power source BTb and the summed voltage of the first and second power sources BTa and BTb, every the first and second converter circuits 11 and 12.

Thereby, for example, if the first to third voltages VB1 to VB3 are the same (VB1=VB2=VB3=VB), the step-up ratio of the voltage applied to a load 13 is controlled to be set at an arbitrary value between 1 to 3.

As illustrated in FIGS. 16C and 16D, the connection switching control unit 22 included in the control device 15 controls a switching operation of the first switching device SW1 and the second switching device SW2 included in the first direct-current power converter circuit 41 based on a first step-up duty DT12. In the switching operation, the first switching device SW1 and the second switching device SW2 are inverted and the alternative close and open (ON/OFF) switching operations of each switching device SW1 and SW2 are performed for each first and second converter circuit 11 and 12. The first step-up duty DT12 is defined by ON time t(SW1) of the first switching device SW1 and ON time t(SW2) of the second switching device SW2. The connection switching control unit 22 can step up the first voltage VBa based on the first step-up duty DT12 and output the step-up voltage from the first direct-current power converter circuit 41. The connection switching control unit 22 controls output voltage V10b of the first direct-current power converter circuit 41 (in other words, the voltage applied between the fifth node E and the fourth node D) based on the first voltage VBa and the first step-up duty DT12.

As illustrated in FIGS. 16C and 16D, the connection switching control unit 22 included in the control device 15 controls a switching operation of the first switching device SW1 and the third switching device SW3 included in the second direct-current power converter circuit 42 based on a second step-up duty DT22. In the switching operation, the first switching device SW1 and the third switching device SW3 are inverted and the alternative close and open (ON/OFF) switching operations of each switching device SW1 and SW3 are performed for each first and second converter circuit 11 and 12. The second step-up duty DT22 is defined by ON time t(SW1) of the first switching device SW1 and ON time t(SW3) of the third switching device SW3. The connection switching control unit 22 can step up the second voltage VBb based on the second step-up duty DT22 and output the step-up voltage from the second direct-current power converter circuit 42. The connection switching control unit 22 controls output voltage V20b of the second direct-current power converter circuit 42 (in other words, the voltage applied between the first node A and the sixth node F) based on the second voltage VBb and the second step-up duty DT22.

Thereby, the connection switching control unit 22 controls arbitrarily the voltage V0, applied between the first node A and the fourth node D, every the first and second converter circuits 11 and 12 so that the voltage V0 is equal to or more than the summed voltage of the first voltage VBa and the second voltage VBb.

Thereby, the voltage applied to the load 13 is controlled to be set at an arbitrary value which is equal to or more than the summed voltage of the first to third voltage V131 to VB3 (VB1+VB2+VB3).

Fifth Example

Hereinafter, a power device 10 according to a fifth example of the embodiment described above will be described with reference to the attached drawings.

Figure 17:
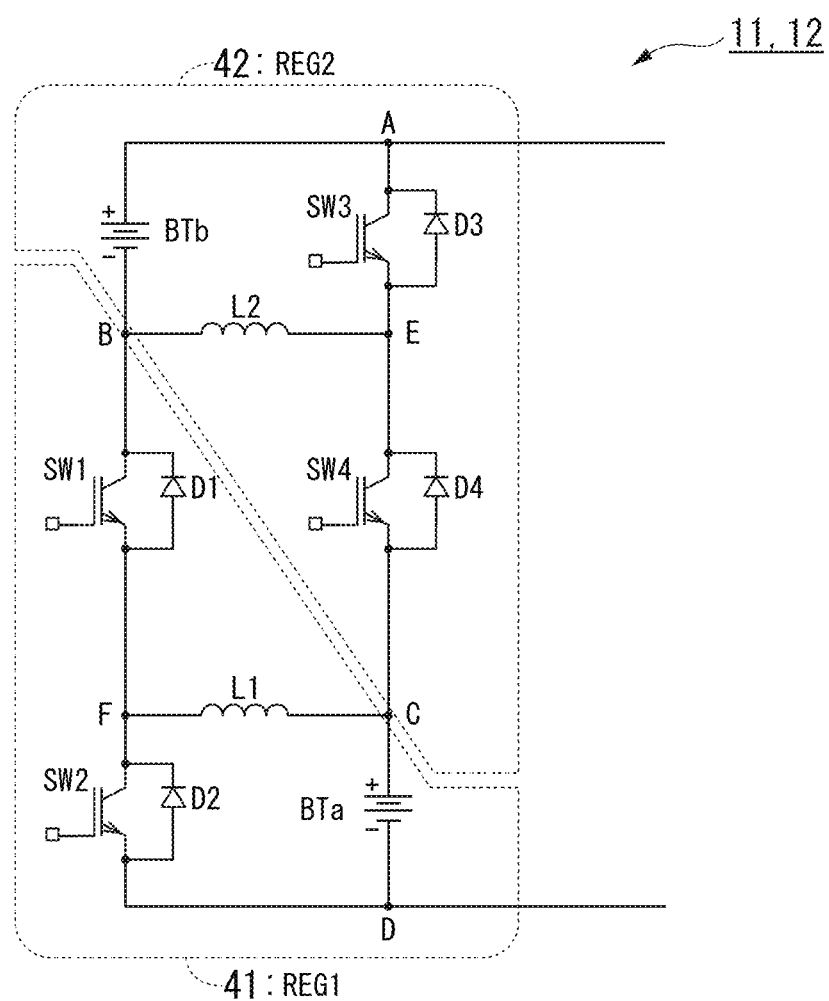
FIG. 17 is a configuration diagram showing a converter circuit according to a fifth example of the embodiment of the present invention.

The power device 10 according to the fifth example includes first and second converter circuits 11 and 12, which are same each other, as illustrated in FIG. 17. Each first and second converter circuit 11 and 12 includes first to sixth nodes A to F, a first direct-current power converter circuit (REG1) 41, and a second direct-current power converter circuit (REG2) 42. The first direct-current power converter circuit (REG1) 41 includes first and second switching devices SW1 and SW2 such as IGBT, and a first reactor L1. The second direct-current power converter circuit (REG2) 42 includes third and fourth switching devices SW3 and SW4 such as IGBT, and a second reactor L2.

A positive electrode of the second power source BTb (a second power source BT2 in the first converter circuit 11, or a third power source BT3 in the second converter circuit 12) is connected with the first node A, a negative electrode of the second power source BTb is connected with the second node B, a positive electrode of the first power source BTa (a first power source BT1 in the first converter circuit 11, or a second power source BT2 in the second converter circuit 12) is connected with the third node C, and a negative electrode of the first power source BTa is connected with the fourth node D. One end of the second reactor L2 is connected with the fifth node E and the other end of the second reactor L2 is connected with the second node B. One end of the first reactor L1 is connected with the sixth node F and the other end of the first reactor L1 is connected with the third node C.

A collector and an emitter of the first switching device SW1 are connected with the second node B and the sixth node F, respectively. A collector and an emitter of the second switching device SW2 are connected with the sixth node F and the fourth node D, respectively. A collector and an emitter of the third switching device SW3 are connected with the first node A and the fifth node E, respectively. A collector and an emitter of the fourth switching device SW4 are connected with the fifth node E and the third node C, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

As illustrated in FIGS. 18A and 18B, a connection switching control unit 22 included in a control device 15 controls a switching operation of the first switching device SW1 and the second switching device SW2 included in the first direct-current power converter circuit 41 based on a first duty DT1. In the switching operation, the first switching device SW1 and the second switching device SW2 are inverted and the alternative close and open (ON/OFF) switching operations of each switching device SW1 and SW2 are performed for each first and second converter circuit 11 and 12. The first duty DT1 is defined by ON time t(SW1) of the first switching device SW1 and ON time t(SW2) of the second switching device SW2. The connection switching control unit 22 can step up a first voltage VBa of the first power source BTa based on the first duty DT1 and output the step-up voltage from the first direct-current power converter circuit 41. The connection switching control unit 22 controls output voltage V10 of the first direct-current power converter circuit 41 (in other words, the voltage applied between the second node B and the fourth node D) based on the first voltage VBa and the first duty DT1.

As illustrated in FIGS. 18A and 18B, the connection switching control unit 22 controls a switching operation of the third switching device SW3 and the fourth switching device SW4 included in the second direct-current power converter circuit 42 based on a second duty DT2. In the switching operation, the third switching device SW3 and the fourth switching device SW4 are inverted and the alternative close and open (ON/OFF) switching operations of each switching device SW3 and SW4 are performed for each first and second converter circuit 11 and 12. The second duty DT2 is defined by ON time t(SW3) of the third switching device SW3 and ON time t(SW4) of the fourth switching device SW4. The connection switching control unit 22 can step up a second voltage VBb of the second power source BTb based on the second duty DT2 and output the step-up voltage from the second direct-current power converter circuit 42. The connection switching control unit 22 controls output voltage V20 of the second direct-current power converter circuit 42 (in other words, the voltage applied between the first node A and the third node C) based on the second voltage VBb and the second duty DT2.

Thereby, the connection switching control unit 22 controls arbitrarily voltage V0, applied between the first node A and the fourth node D, every the first and second converter circuits 11 and 12 so that the voltage V0 is equal to or more than the summed voltage of the first voltage VBa and the second voltage VBb.

Thereby, the voltage applied to a load 13 is controlled to be set at an arbitrary value which is equal to or more than the summed voltage of the first to third voltage VB 1 to VB3 (VB1+VB2+VB3).

Sixth Example

Hereinafter, a power device 10 according to a sixth example of the embodiment described above will be described with reference to the attached drawings.

Figure 19:
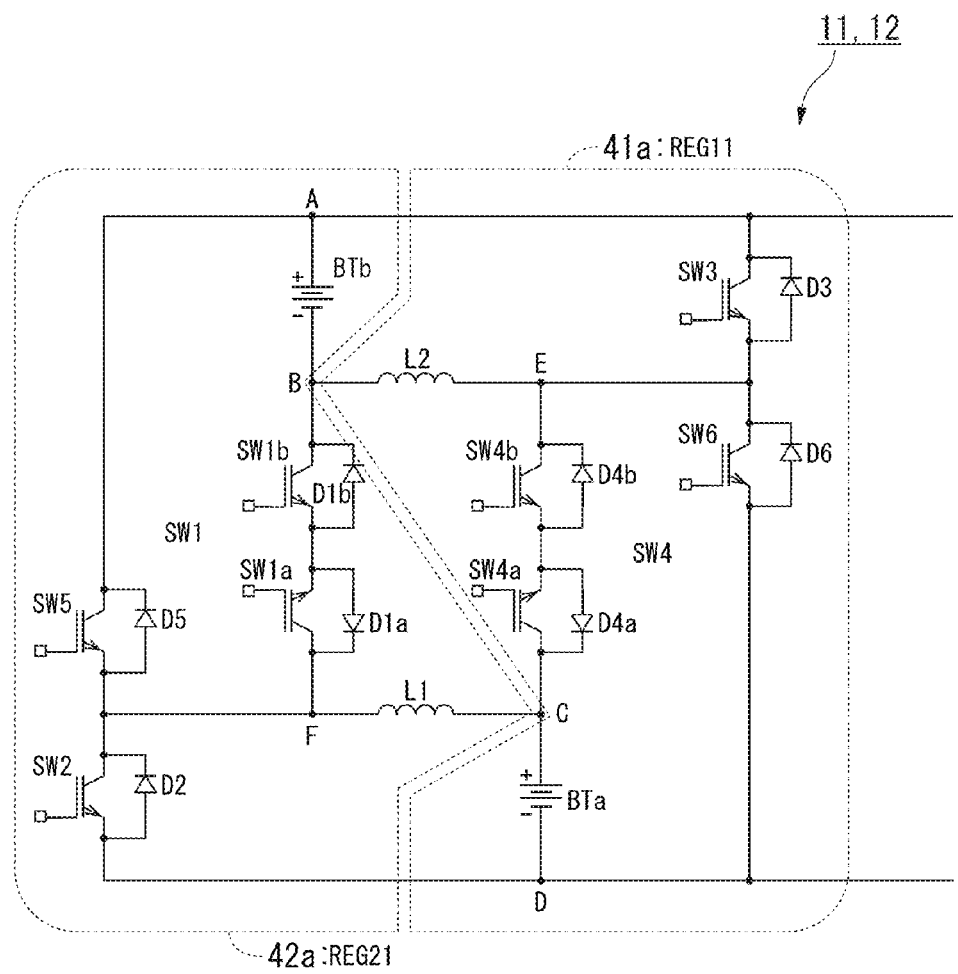
FIG. 19 is a configuration diagram showing a converter circuit according to a sixth example of the embodiment of the present invention.
Figure 20:
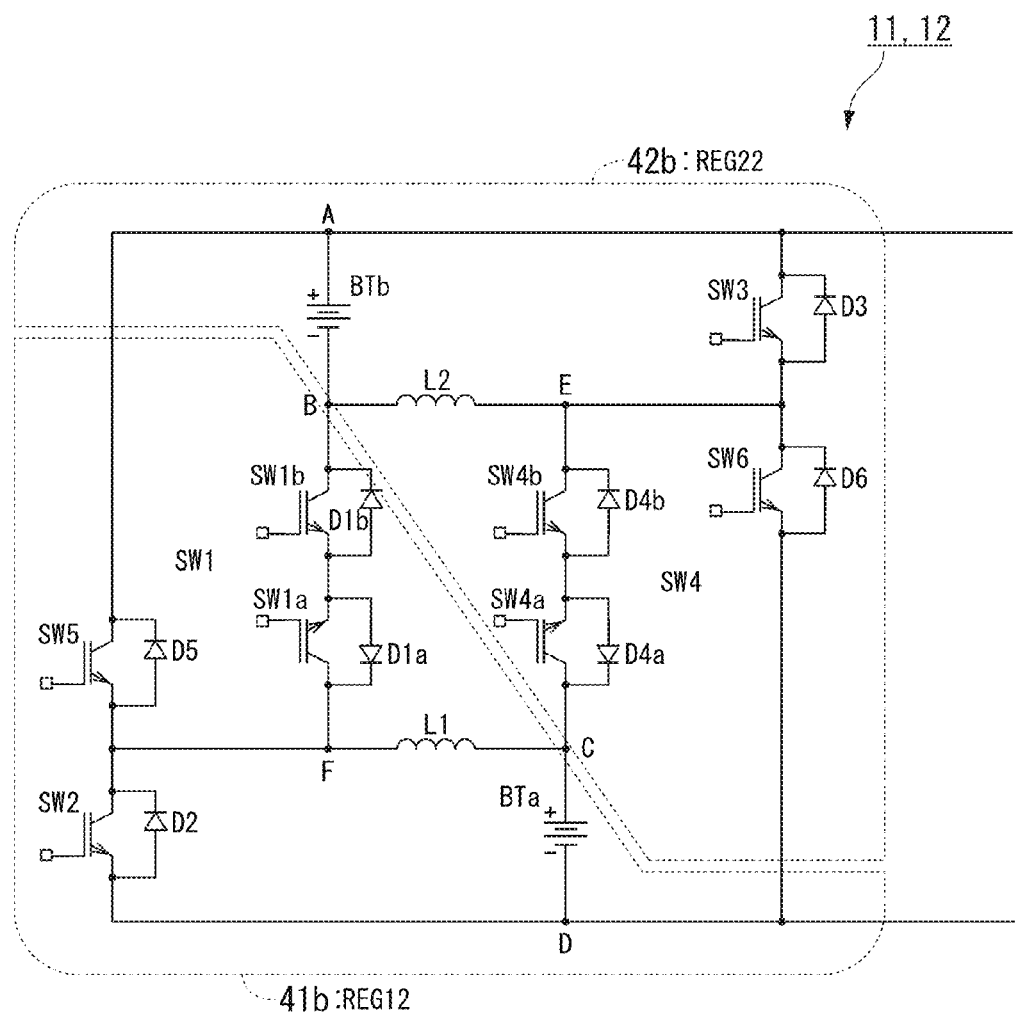
FIG. 20 is a configuration diagram showing a converter circuit according to a sixth example of the embodiment of the present invention.

As illustrated in FIGS. 19 and 20, each first and second converter circuit 11 and 12 of the power device 10 according to the sixth example includes first and fourth switching devices SW1 and SW4, each of which is a bidirectional switch, instead of the switching devices SW1 and SW4 of the fifth example, and further includes fifth and sixth switching devices SW5 and SW6.

As illustrated in FIG. 19, each first and second converter circuit 11 and 12 according to the sixth example includes a first step-down direct-current power converter circuit (REG11) 41a and a second step-down direct-current power converter circuit (REG21) 42a. The first step-down direct-current power converter circuit (REG11) 41a includes a third switching device SW3, a fourth switching device SW4, a sixth switching device SW6, and a second reactor L2. The second step-down direct-current power converter circuit (REG21) 42a includes a first switching device SW1, a second switching device SW2, a fifth switching device SW5, and a first reactor L1.

As illustrated in FIG. 20, each first and second converter circuit 11 and 12 includes a first step-up direct-current power converter circuit (REG12) 41b and a second step-up direct-current power converter circuit (REG22) 42b, instead of the first step-down direct-current power converter circuit 41a and the second step-down direct-current power converter circuit 42a. The first step-up direct-current power converter circuit (REG12) 41b includes a first switching device SW1, a second switching device SW2, a fifth switching device SW5, and a first reactor L1. The second step-up direct-current power converter circuit (REG22) 42b includes a third switching device SW3, a fourth switching device SW4, a sixth switching device SW6, and a second reactor L2.

For example, the first switching device SW1, which is a bidirectional switch, includes two switching devices SW1a and SW1b. These two switching devices SW1a and SW1b are connected in series to have opposite polarities. For example, the fourth switching device SW4, which is a bidirectional switch, includes two switching devices SW4a and SW4b. These two switching devices SW4a and SW4b are connected in series to have opposite polarities.

A collector and an emitter of the fifth switching device SW5 are connected with a first node A and a sixth node F, respectively. A collector and an emitter of the sixth switching device SW6 are connected with a fifth node E and a fourth node D, respectively. A fifth diode D5 is connected between the emitter and collector of the fifth switching device SW5, and a sixth diode D6 is connected between the emitter and collector of the sixth switching device SW6. The direction from the emitter to the collector of each switching device SW5 and SW6 is a forward direction of each diode D5 and D6.

Figure 21A:
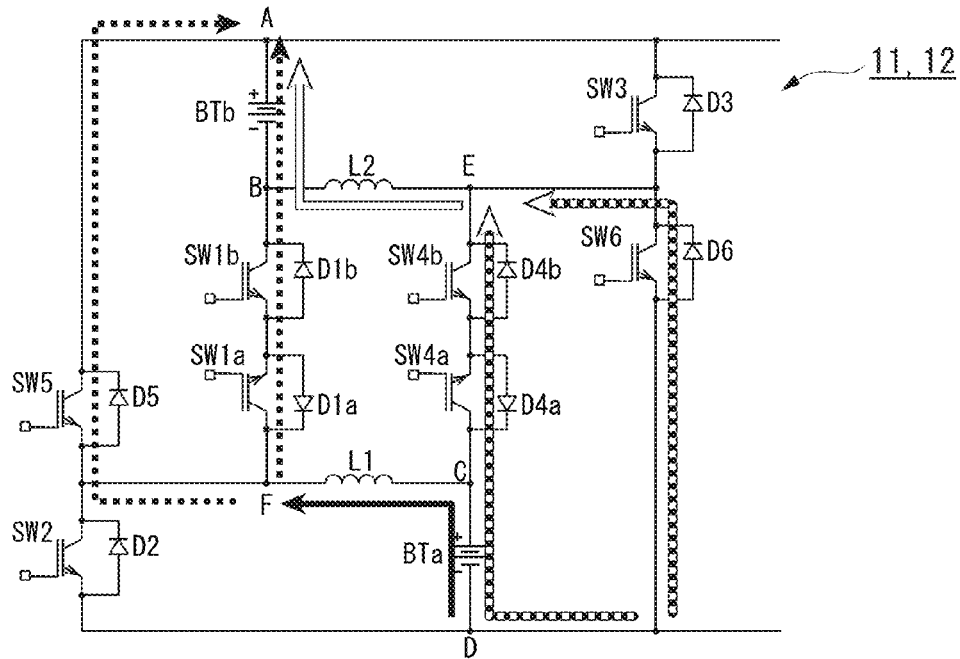
FIG. 21A is a diagram showing ON/OFF of each switching device and a current flow when the converter circuit according to the sixth example of the embodiment of the present invention is in a power mode.

As illustrated in FIGS. 21A and 2113, a connection switching control unit 22 included in a control device 15 controls a switching operation of the fourth switching device SW4 and the sixth switching device SW6 included in the first step-down direct-current power converter circuit 41a based on a first step-down duty DT11. In the switching operation, the fourth switching device SW4 and the sixth switching device SW6 are inverted and the alternative close and open (ON/OFF) switching operations of each switching device SW4 and SW6 are performed for each first and second converter circuit 11 and 12. The first step-down duty DT11 is defined by ON time t(SW4) of the fourth switching device SW4 and ON time t(SW6) of the sixth switching device SW6. The connection switching control unit 22 can step down a first voltage VB1 based on the first step-down duty DT11 and output the step-down voltage from the first step-down direct-current power converter circuit 41a. The connection switching control unit 22 controls output voltage V10a of the first step-down direct-current power converter circuit 41a (in other words, the voltage applied between the second node B and the fourth node D) as the product of the first voltage VBa and the first step-down duty DT11 (VBa*DT11=V10a).

Figure 21B:
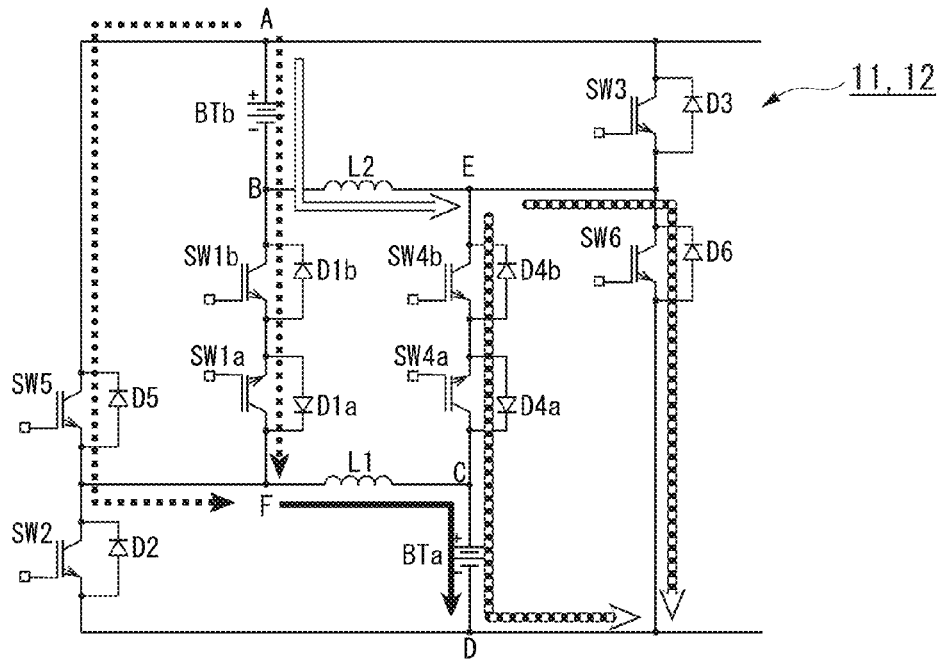
FIG. 21B is a diagram showing ON/OFF of each switching device and a current flow when the converter circuit according to the sixth example of the embodiment of the present invention is in a regenerative mode.

As illustrated in FIGS. 21A and 21B, the connection switching control unit 22 controls a switching operation of the first switching device SW1 and the fifth switching device SW5 included in the second step-down direct-current power converter circuit 42a based on a second step-down duty DT21. In the switching operation, the first switching device SW1 and the fifth switching device SW5 are inverted and the alternative close and open (ON/OFF) switching operations of each switching device SW1 and SW5 are performed for each first and second converter circuit 11 and 12. The second step-down duty DT21 is defined by ON time t(SW1) of the first switching device SW1 and ON time t(SW5) of the fifth switching device SW5. The connection switching control unit 22 can step down a second voltage VBb based on the second step-down duty DT21 and output the step-down voltage from the second step-down direct-current power converter circuit 42a. The connection switching control unit 22 controls output voltage V20a of the second step-down direct-current power converter circuit 42a (in other words, the voltage applied between the first node A and the third node C) as the product of the second voltage VBb and the second step-down duty DT21 (VBb*DT21=V20a).

Thereby, the connection switching control unit 22 controls arbitrarily a voltage V0, applied between the first node A and the fourth node D, to be between the voltage of the first power source BTa or the second power source BTb and the summed voltage of the first and second power sources BTa and BTb, every the first and second converter circuits 11 and 12.

Thereby, for example, if the first to third voltages VB 1 to VB3 are the same (VB1=VB2=VB3=VB), the step-up ratio of the voltage applied to a load 13 is controlled to be set at an arbitrary value between 1 to 3.

Figure 21C:
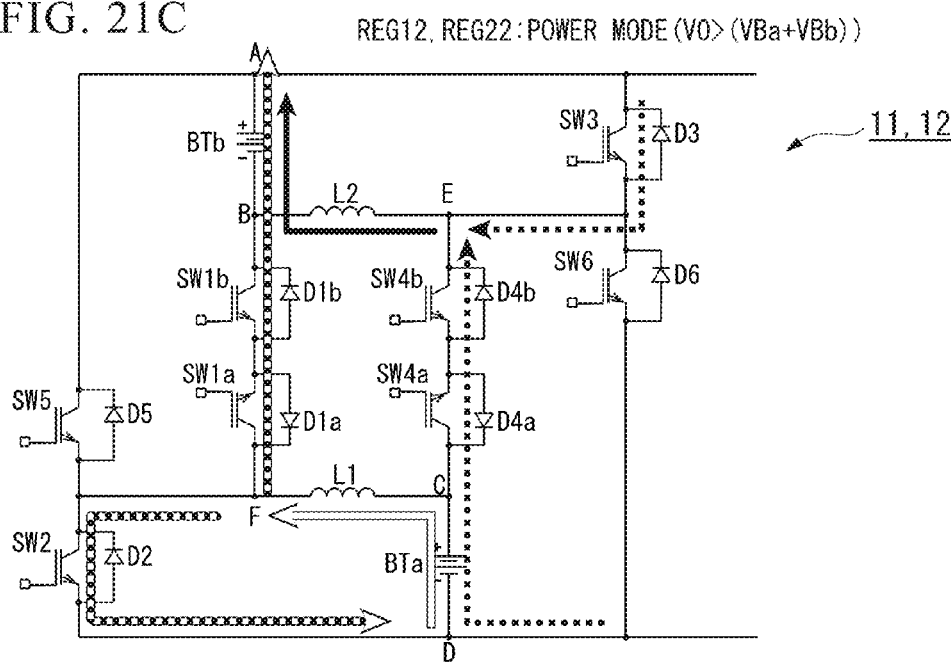
FIG. 21C is a diagram showing ON/OFF of each switching device and a current flow when the converter circuit according to the sixth example of the embodiment of the present invention is in a power mode.
Figure 21D:
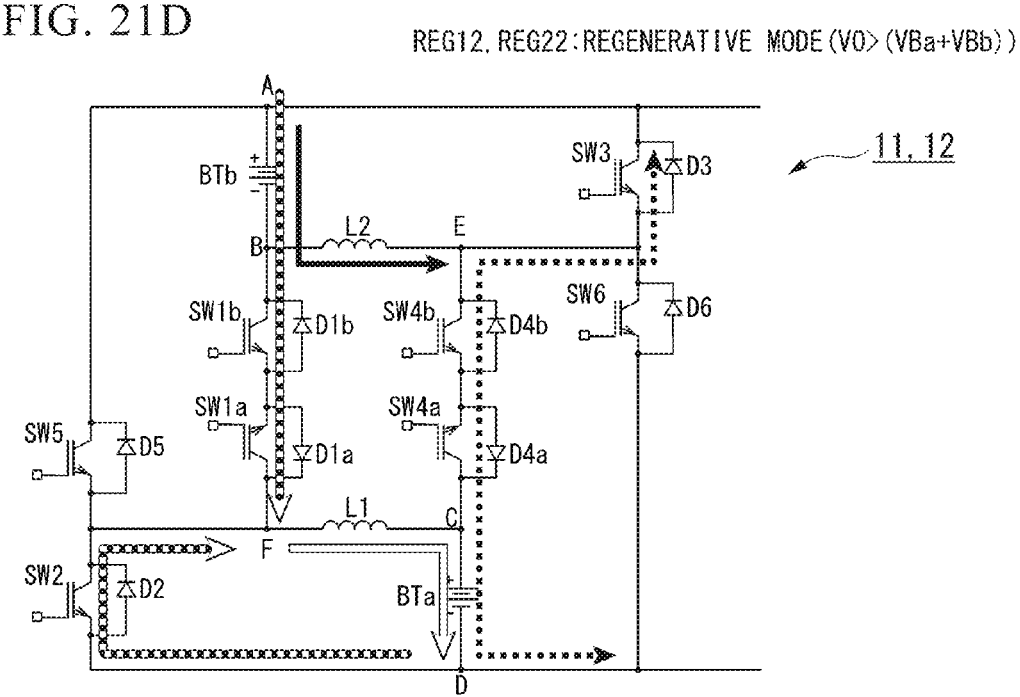
FIG. 21D is a diagram showing ON/OFF of each switching device and a current flow when the converter circuit according to the sixth example of the embodiment of the present invention is in a regenerative mode.

As illustrated in FIGS. 21C and 21D, the connection switching control unit 22 included in the control device 15 controls a switching operation of the first switching device SW1 and the second switching device SW2 included in the first step-up direct-current power converter circuit 41b based on a first step-up duty DT12. In the switching operation, the first switching device SW1 and the second switching device SW2 are inverted and the alternative close and open (ON/OFF) switching operations of each switching device SW1 and SW2 are performed for each first and second converter circuit 11 and 12. The first step-up duty DT12 is defined by ON time t(SW1) of the first switching device SW1 and ON time t(SW2) of the second switching device SW2. The connection switching control unit 22 can step up the first voltage VBa based on the first step-up duty DT12 and output the step-up voltage from the first step-up direct-current power converter circuit 41b. The connection switching control unit 22 controls output voltage V10b of the first step-up direct-current power converter circuit 41b (in other words, the voltage applied between the second node B and the fourth node D) based on the first voltage VBa and the first step-up duty DT12.

As illustrated in FIGS. 21C and 21D, the connection switching control unit 22 controls a switching operation of the third device SW3 and the fourth switching device SW4 included in the second step-up direct-current power converter circuit 42b based on a second step-up duty DT22. In the switching operation, the third switching device SW3 and the fourth switching device SW4 are inverted and the alternative close and open (ON/OFF) switching operations of each switching device SW3 and SW4 are performed for each first and second converter circuit 11 and 12. The second step-up duty DT22 is defined by ON time t(SW3) of the third switching device SW3 and ON time t(SW4) of the fourth switching device SW4. The connection switching control unit 22 can step up a second voltage VBb based on the second step-up duty DT22 and output the step-up voltage from the second step-up direct-current power converter circuit 42b. The connection switching control unit 22 controls output voltage V20b of the second step-up direct-current power converter circuit 42b (in other words, the voltage applied between the first node A and the third node C) based on the second voltage VBb and the second step-up duty DT22.

Thereby, the connection switching control unit 22 controls arbitrarily the voltage V0, applied between the first node A and the fourth node D, every the first and second converter circuits 11 and 12 so that the voltage V0 is equal to or more than the summed voltage of the first voltage VBa and the second voltage VBb.

Thereby, the voltage applied to the load 13 is controlled to be set at an arbitrary value which is equal to or more than the summed voltage of the first to third voltage VB1 to VB3 (VB1+VB2+VB3).

Seventh Example

Hereinafter, a power device 10 according to a seventh example of the embodiment described above will be described with reference to the attached drawings.

Figure 22:
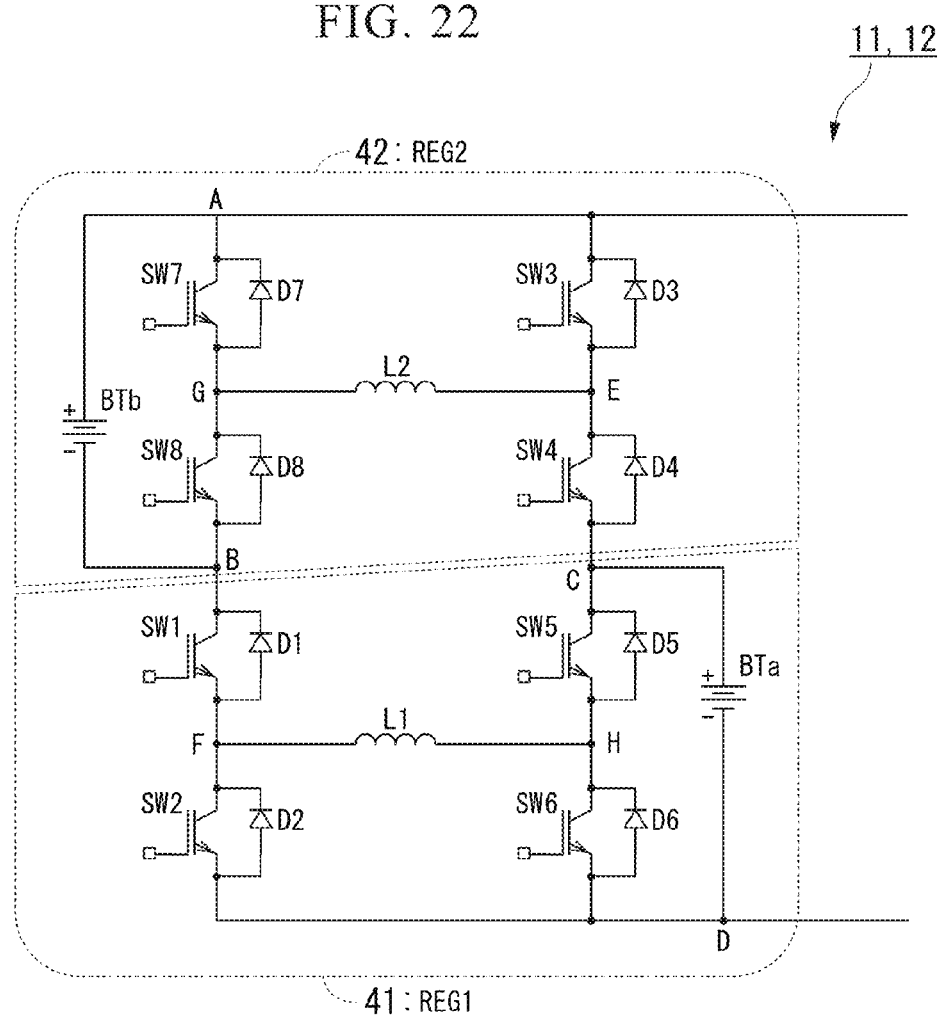
FIG. 22 is a configuration diagram showing a converter circuit according to a seventh example of the embodiment of the present invention.

As illustrated in FIG. 22, each first and second converter circuit 11 and 12 of the power device 10 according to the seventh example further includes seventh and eighth nodes G and H, and fifth to eighth switching devices SW5 to SW8 compared to the fifth example described above.

Each first and second converter circuit 11 and 12 according to the seventh example includes a first direct-current power converter circuit (REG1) 41 and a second direct-current power converter circuit (REG2) 42. The first direct-current power converter circuit (REG1) 41 includes a first switching device SW1, a second switching device SW2, a fifth switching device SW5, and a sixth switching device SW6, and a first reactor L1. The second direct-current power converter circuit (REG2) 42 includes a third switching device SW3, a fourth switching device SW4, a seventh switching device SW7, and an eighth switching device SW8, and a second reactor L2.

The seventh node G is provided between a second node B and the second reactor L2. The eighth node H is provided between a third node C and the first reactor L1.

A collector and an emitter of the fifth switching device SW5 are connected with the third node C and the eighth node H, respectively. A collector and an emitter of the sixth switching device SW6 are connected with the eighth node H and a fourth node D, respectively. A collector and an emitter of the seventh switching device SW7 are connected with a first node A and the seventh node G, respectively. A collector and an emitter of the eighth switching device SW8 are connected with the seventh node G and the second node B, respectively. Fifth to eighth diodes D5 to D8 are connected between the emitter and collector of the switching devices SW5 to SW8, respectively. The direction from the emitter to the collector of each switching device SW5 to SW8 is a forward direction of each diode D5 to D8.

As illustrated in FIGS. 23A and 23B, a connection switching control unit 22 included in a control device 15 controls a switching operation of the fifth switching device SW5 and the sixth switching device SW6 included in the first direct-current power converter circuit 41 based on a first step-down duty DT11. In the switching operation, the fifth switching device SW5 and the sixth switching device SW6 are inverted and the alternative close and open (ON/OFF) switching operations of each switching device SW5 and SW6 are performed for each first and second converter circuit 11 and 12. The first step-down duty DT11 is defined by ON time t(SW5) of the fifth switching device SW5 and ON time t(SW6) of the sixth switching device SW6. The connection switching control unit 22 can step down a first voltage VBa based on the first step-down duty DT11 and output the step-down voltage from the first direct-current power converter circuit 41. The connection switching control unit 22 controls output voltage V10a of the first direct-current power converter circuit 41 (in other words, the voltage applied between the second node B and the fourth node D) as the product of the first voltage VBa and the first step-down duty DT11 (VBa*DT11=V10a).

As illustrated in FIGS. 23A and 23B, the connection switching control unit 22 controls a switching operation of the seventh switching device SW7 and the eighth switching device SW8 included in the second direct-current power converter circuit 42 based on a second step-down duty DT21. In the switching operation, the seventh switching device SW7 and the eighth switching device SW8 are inverted and the alternative close and open (ON/OFF) switching operations of each switching device SW7 and SW8 are performed for each first and second converter circuit 11 and 12. The second step-down duty DT21 is defined by ON time t(SW8) of the eighth switching device SW8 and ON time t(SW7) of the seventh switching device SW7. The connection switching control unit 22 can step down a second voltage VBb based on the second step-down duty DT21 and output the step-down voltage from the second direct-current power converter circuit 42. The connection switching control unit 22 controls output voltage V20a of the second direct-current power converter circuit 42 (in other words, the voltage applied between the first node A and the third node C) as the product of the second voltage VBb and the second step-down duty DT21 (VBb*DT21=V20a).

Thereby, the connection switching control unit 22 controls arbitrarily voltage V0, applied between the first node A and the fourth node D, every the first and second converter circuits 11 and 12 so that the voltage V0 is between the voltage of the first power source BTa or the second power source BTb and the summed voltage of the first and second power sources BTa and BTb.

Thereby, for example, if the first to third voltages VB1 to VB3 are the same (VB1=VB2=VB3=VB), the step-up ratio of the voltage applied to a load 13 is controlled to be set at an arbitrary value between 1 to 3.

As illustrated in FIGS. 23C and 23D, the connection switching control unit 22 included in the control device 15 controls a switching operation of the first switching device SW1 and the second switching device SW2 included in the first direct-current power converter circuit 41 based on a first step-up duty DT12. In the switching operation, the first switching device SW1 and the second switching device SW2 are inverted and the alternative close and open (ON/OFF) switching operations of each switching device SW1 and SW2 are performed for each first and second converter circuit 11 and 12. The first step-up duty DT12 is defined by ON time t(SW1) of the first switching device SW1 and ON time t(SW2) of the second switching device SW2. The connection switching control unit 22 can step up the first voltage VBa based on the first step-up duty DT12 and output the step-up voltage from the first direct-current power converter circuit 41. The connection switching control unit 22 controls output voltage V10b of the first direct-current power converter circuit 41 (in other words, the voltage applied between the second node B and the fourth node D) based on the first voltage VBa and the first step-up duty DT12.

As illustrated in FIGS. 23C and 23D, the connection switching control unit 22 controls a switching operation of the third device SW3 and the fourth switching device SW4 included in the second direct-current power converter circuit 42 based on a second step-up duty DT22. In the switching operation, the third switching device SW3 and the fourth switching device SW4 are inverted and the alternative close and open (ON/OFF) switching operations of each switching device SW3 and SW4 are performed for each first and second converter circuit 11 and 12. The second step-up duty DT22 is defined by ON time t(SW3) of the third switching device SW3 and ON time t(SW4) of the fourth switching device SW4. The connection switching control unit 22 can step up a second voltage VBb based on the second step-up duty DT22 and output the step-up voltage from the second direct-current power converter circuit 42. The connection switching control unit 22 controls output voltage V20b of the second direct-current power converter circuit 42 (in other words, the voltage applied between the first node A and the third node C) based on the second voltage VBb and the second step-up duty DT22.

Thereby, the connection switching control unit 22 controls arbitrarily the voltage V0, applied between the first node A and the fourth node D, every the first and second converter circuits 11 and 12 so that the voltage V0 is equal to or more than the summed voltage of the first voltage VBa and the second voltage VBb.

Thereby, the voltage applied to the load 13 is controlled to be set at an arbitrary value which is equal to or more than the summed voltage of the first to third voltage VB 1 to VB3 (VB1+VB2+VB3).

The technical scope of the present invention is not limited to the embodiments described above, and includes variations where a variety of modifications are made in the embodiments described above without departing from the spirit or scope of the present invention. In other words, the embodiments described above are illustrative only, and modifications may be made accordingly in the embodiments.

For example, the power source ST is not limited to a dischargeable and chargeable battery. The power source BT may be a fuel cell or a power generator which is only capable of discharging power.

What is claimed is:
1. A power device, comprising:
at least three power sources being a first power source, a second power source, and a third power source;
a load configured to be driven by a power, the power being supplied from the power source; and
a voltage control unit configured to control a voltage to be applied to the load, the voltage control unit comprising:
at least two converter circuits being a first converter circuit and a second converter circuit; and
several electrical potential points including a first electrical potential point connected with a negative electrode of the first power source, a second electrical potential point connected with a positive electrode of the first power source, a third electrical potential point connected with a negative electrode of the second power source, a fourth electrical potential point connected with a positive electrode of the second power source, a fifth electrical potential point connected with a negative electrode of the third power source, and a sixth electrical potential point connected with a positive electrode of the third power source; the first converter circuit being connected with the first electrical potential point, the second electrical potential point, the third electrical potential point, and the fourth electrical potential point; the second converter circuit being connected with the third electrical potential point, the fourth electrical potential point, the fifth electrical potential point, and the sixth electrical potential point; the first converter circuit being configured to at least one of (a) control a voltage, applied between the first electrical potential point and the fourth electrical potential point, to be within a range from a voltage of the first power source or a voltage of the second power source to a summed voltage of the voltage of the first power source and the voltage of the second power source, and (b) control the voltage, applied between the first electrical potential point and the fourth electrical potential point, to be equal to or more than the summed voltage of the voltage of the first power source and the voltage of the second power source; the second converter circuit being configured to at least one of (a) control a voltage, applied between the third electrical potential point and the sixth electrical potential point, to be within the range from a voltage of the second power source or a voltage of the third power source to a summed voltage of the voltage of the second power source and the voltage of the third power source, and (b) control the voltage, applied between the third electrical potential point and the sixth electrical potential point, to be equal to or more than the summed voltage of the voltage of the second power source and the voltage of the third power source.

2. A power device, comprising:
N power sources being first to N-th power sources, where N is a natural number which is equal to or more than 3;
a load configured to be driven by a power, the power being supplied from the power source; and
a voltage control unit configured to control a voltage to be applied to the load, the voltage control unit comprising:
(2N) electrical potential points being first to (2N)-th electrical potential points; and
(N−1) converter circuits being first to (N−1)-th converter circuits, a negative electrode of the K-th power sources being connected to the (2K−1)-th electrical potential point, and a positive electrode of the K-th power sources being connected to the (2K)-th electrical potential point, the L-th converter circuit being connected to the (2L−1)-th to (2L+2)-th electrical potential points, the L-th converter circuit being configured to at least one of control a voltage, applied between the (2L−1)-th electrical potential point and the (2L+2)-th electrical potential point, to be within a range from a voltage of the L-th power source or a voltage of the (L+1)-th power source to a summed voltage of the voltage of the L-th power source and the voltage of the (L+1)-th power source, and control the voltage, applied between the (2L−1)-th electrical potential point and the (2L+2)-th electrical potential point, to be equal to or more than the summed voltage of the voltage of the voltage of the L-th power source and the voltage of the (L+1)-th power source, where K is an arbitrary natural number which is equal or less than N, and L is an arbitrary natural number which is equal or less than (N−1).

3. The power device according to claim 2, further comprising:
a second load connected with at least one of the first to (N−1)-th converter circuits.

4. The power device according to claim 2, further comprising:
a third load connected with at least one of the first to N-th power sources in parallel.

5. The power device according to claim 3, further comprising:
a third load connected with at least one of the first to N-th power sources in parallel.

6. The power device according to claim 2, further comprising:
a fourth load having a first end and a second end, the first end of the fourth load being connected with a first of a pair among the first to (2N)-th electrical potential points, the second end of the fourth load being connected with a second of the pair.

7. The power device according to claim 3, further comprising:
a fourth load having a first end and a second end, the first end of the fourth load being connected with a first of a pair among the first to (2N)-th electrical potential points, the second end of the fourth load being connected with a second of the pair.

8. The power device according to claim 4, further comprising:
a fourth load having a first end and a second end, the first end of the fourth load being connected with a first of a pair among the first to (2N)-th electrical potential points, the second end of the fourth load being connected with a second of the pair.

9. The power device according to claim 5, further comprising:
a fourth load having a first end and a second end, the first end of the fourth load being connected with a first of a pair among the first to (2N)-th electrical potential points, the second end of the fourth load being connected with a second of the pair.

* * * * *